US010502826B2

(12) United States Patent
Tasovac et al.

(10) Patent No.: US 10,502,826 B2
(45) Date of Patent: Dec. 10, 2019

(54) MILLIMETER-WAVE SENSOR SYSTEM FOR PARKING ASSISTANCE

(71) Applicant: NOVELIC D.O.O., Belgrade (RS)

(72) Inventors: Darko Tasovac, Belgrade (RS); Veljko Mihajlović, Belgrade (RS); Veselin Branković, Belgrade (RS); Dušan Krčum, Belgrade (RS); Ivan Milosavljević, Belgrade (RS)

(73) Assignee: NOVELIC D.O.O., Belgrade (RS)

( * ) Notice: Subject to any disclaimer, the term of this patent is extended or adjusted under 35 U.S.C. 154(b) by 166 days.

(21) Appl. No.: 15/580,293

(22) PCT Filed: Jun. 17, 2015

(86) PCT No.: PCT/RS2015/000016

§ 371 (c)(1),
(2) Date: Dec. 7, 2017

(87) PCT Pub. No.: WO2016/204641

PCT Pub. Date: Dec. 22, 2016

(65) Prior Publication Data

US 2018/0164429 A1 Jun. 14, 2018

(51) Int. Cl.
*G01S 13/93* (2006.01)
*G01S 13/44* (2006.01)
(Continued)

(52) U.S. Cl.
CPC ........ *G01S 13/931* (2013.01); *G01S 13/4445* (2013.01); *G01S 13/584* (2013.01);
(Continued)

(58) Field of Classification Search
None
See application file for complete search history.

(56) References Cited

U.S. PATENT DOCUMENTS 5,592,170 A * 1/1997 Price ........................ F41H 11/16 342/22
6,075,479 A * 6/2000 Kudoh .................... G01S 7/292 342/159

(Continued)

FOREIGN PATENT DOCUMENTS

DE 10 2012 201367 A1 8/2013

*Primary Examiner* — Thomas S McCormack
(74) *Attorney, Agent, or Firm* — Luoh J. Wu; Continent Patent Office LLP

(57) ABSTRACT

The present invention relates to a parking support Apparatus and Method of operation comprising of an mm-wave radar sensor, having an integrated mm-wave IC front end. The proposed Apparatus is capable of detecting the parking obstacle object distance and angle, having inherently low cost system topology, suitable as a replacement in functionality for the commonly used ultrasound sensors. The proposed apparatus topology consist of one transmitting and two planar antennae, mm-wave radar topology with one down conversion chain and one transmitter chain based on FMCW radar, CW radar and Doppler radar, analog combining circuitry and N mm-wave power detectors, where N takes integer values from 1 and larger. The specific proposed method of operation is adjusted to a dedicated application. A combination of more than one proposed apparatus enables smart observation of the parking area in front of the moving platform with wired or wireless connection to the information evaluation and control entity. The proposed apparatus topology with lower complexity consist of one transmit and two planar antennae, mm-wave radar topology without any down conversion chain and one transmitter chain based on CW radar operation, analog combining circuitry and N mm-wave power detectors, where N takes values from 1 to 3. The system operation topology allows full distance and obstacle angle calculation by the apparatus itself in one topology solution or to have the information being calcu- (Continued)

lated, combining more sensors, using low complexity apparatus topologies, also proposed in this innovation. The integration of the proposed apparatus in the vehicle bumper is inherently possible and may be optically and functionally provided as an efficient replacement for ultrasound parking assist systems. The complete proposed sensor apparatus topologies with integrated antennae, mm-wave IC and digital processing parts may be realized in a module smaller than 1×1×0.5 cm and operating in the 77-81 GHz band.

21 Claims, 16 Drawing Sheets

(51) Int. Cl.
*G01S 13/58* (2006.01)
*G01S 13/87* (2006.01)

(52) U.S. Cl.
CPC ..... *G01S 13/878* (2013.01); *G01S 2013/9314* (2013.01); *G01S 2013/9385* (2013.01); *G01S 2013/9389* (2013.01)

(56) References Cited

U.S. PATENT DOCUMENTS

| | | | | |
|---|---|---|---|---|
| 6,320,531 | B1 * | 11/2001 | Tamatsu | G01S 13/343 342/109 |
| 6,335,700 | B1 * | 1/2002 | Ashihara | G01S 7/4004 342/117 |
| 7,068,211 | B2 * | 6/2006 | Oswald | G01S 13/931 342/27 |
| 2004/0145512 | A1 * | 7/2004 | Takano | G01S 13/348 342/70 |
| 2009/0121918 | A1 | 5/2009 | Shirai et al. | |
| 2009/0251362 | A1 | 10/2009 | Margomenos et al. | |
| 2009/0309784 | A1 * | 12/2009 | Natsume | G01S 13/426 342/189 |
| 2014/0002296 | A1 * | 1/2014 | Izumi | G01S 13/345 342/149 |
| 2014/0285373 | A1 * | 9/2014 | Kuwahara | G01S 13/931 342/27 |
| 2015/0061923 | A1 * | 3/2015 | Sato | G01S 13/4454 342/149 |
| 2016/0084939 | A1 * | 3/2016 | Hasegawa | G01S 7/4026 342/147 |
| 2017/0160391 | A1 * | 6/2017 | Satou | G01S 13/536 |

* cited by examiner a) Apparatus 100. Only power detector <PD2> is needed b) Apparatus 100. Angle detection up to +/-55 degrees a) Apparatus 101, 102b. Angle detection up to +/-55 degrees b) Apparatus 101, 102b angle detection up to +/- 40 degrees

MILLIMETER-WAVE SENSOR SYSTEM FOR PARKING ASSISTANCE

TECHNICAL FIELD

The present invention relates to a parking support Apparatus and Method of Operation comprising of mm-wave radar sensor with integrated mm-wave IC Front and having innovative topology. The proposed Apparatus is capable of detecting the object distance and parking obstacle angle, having inherently low cost system topology and is suitable as a functional replacement for the commonly used ultrasound sensors. The proposed Apparatus topology consists of one transmitting and two receiving planar antennae, mm-wave radar topology, analog combining circuitry and N mm-wave power detectors, where N takes integer values from 1 and higher. The mm-wave radar topology consists of one down conversion chain and one transmitter chain based on FMCW radar, CW radar and Doppler radar operation principles. Specific proposed method of operation is proposed to provide the specific proposed Apparatus operation.

BACKGROUND ART

There is a strong motivation to deploy smart, small in size, small in power consumption and low-cost sensors for vehicle parking support applications, in the following application scenarios and specific features:

a) Detection of obstacle distance at distances beyond 10 m.
b) Detection of obstacle angles related to sensor orientation, without inherently needing to process date from other sensors, as today is the case with ultrasound based parking systems.
c) Operation of the sensors integrated in the bumper or in other vehicle parts, not visible outside the vehicle, as commonly is the case with ultrasound parking systems.
d) Operation of the sensors connected with several identical sensors to provide more robust information for parking assistance.
e) Additional features to detect human or other living beings in the area intended for vehicle parking, with no extra hardware cost.
f) Additional features to detect vehicle vibrations, with no extra hardware cost.
g) Optional operation feature in case of several sensors are integrated in the bumper, in order to improve obstacle distance and angle accuracy, by processing data from more than one sensor integrated in the vehicle bumper.

The majority of the state-of-the-art parking support sensors currently deployed are based on ultrasound technology. This approach has an inherent drawback, in that sensors integrated in the vehicle are visible. This is due to the nature of ultrasound propagation properties, where the bumper material does not allow for propagation of the ultrasound in an easy and usable manner. Furthermore, the external operation unit must procure additional processing power to provide accurate parking support information tithe driver. The driver is provided with the information about the existence of the obstacle, but is unable to get information if the obstacle could potentially be a living being, like a cat or a dog. On the other hand, these well-established ultrasound technology systems achieved huge production maturity and a low system cost.

Alternative solutions for parking support could be mm-wave radar systems, which are currently deployed mainly for long distance obstacle detections. In these operation modes, they must have high gain antennae, which implies larger size and other special features related to beam forming, tracking and object identifications. State of the art mm-wave radar IC structures in automotive frequency bands usually have 2 transmit chains and 4 receive chains. The cost of such system with antenna and the assembly is high, with mm-wave IC typically realized in SiGe BiCMOS technology. Integrated PLL and technology transfers to CMOS are currently being announced, to be designed on product level. Millimeter-wave radar systems could be integrated in the vehicle bumper, but having communication losses and system topologies of mm-wave sensors and methods of operation, do not allow for low system cost. At least not low enough to be a valuable replacement path for the ultrasound sensors. The number of transmit and receive channels is too high, power levels are too high, the dynamic range is not adjusted for special applications and a complicated signal processing is required.

The following published patents and patent applications show the relevance of the topic and the state-of-the-art in respect to mm-wave systems, as well as approaches for mm-wave radar system direction of arrival.

It may be observed that there are no radar-based sensor solutions reported, for systems able to detect both the distance and at the same time and in a simple manner, able to detect the angle of the obstacle, yet having only one down conversion chain or one Rx down conversion channel. Also, there are proposed radar sensor topology solutions reported, capable of additional features in detecting the obstacle's internal vibrations, resulting in the detection of living thing.

DE 102012201367, "The millimeter wave radar" introduces a millimeter-wave radar device with at least one millimeter wave circuit and at least one antenna, constructed as a module of a multi-layer multi-polymer board.

U.S. Pat. No. 7,782,251, "Mobile millimeter wave imaging radar system" introduces a short range complex millimeter wave imaging radar system, having scanned Tx and Rx antennae.

U.S. Pat. No. 7,379,020, "Apparatus and method for estimating direction of arrival of radio wave", by Fujitsu, describes a system with heavy mathematical calculation necessary for the direction of arrival calculation.

U.S. Pat. No. 4,929,958, "High precision radar detection system and method" describes the systems with four transducers to accurately determine the azimuth angle of a radar emitting object.

U.S. Pat. No. 5,724,047, "Phase and time-difference precision direction finding system" by Hughes Electronics, describes the system using the time difference of arrival (TDOA) of the signal at the two antenna elements. TDOA is measured using leading edge envelope detection for simple pulsed signals and pre-detection correlation for phase and frequency modulated signals.

U.S. Pat. No. 8,779,969, "Radar device for detecting azimuth of target" by Denso, describes azimuth detection by analyzing echoes by spectrum performance, excited by frequency ramped signal, mixed by the excitation signal.

U.S. Pat. No. 6,011,514, "Means for extracting phase information for radio frequency direction of arrival", describes the approach with processing the signals at IF frequency level, where the signals are pulsed based signals.

U.S. Pat. No. 5,657,027, "A Two dimensional interferometer array", treats two dimensional problem approach using 4 receiving channels and specific digital processing.

SUMMARY OF INVENTION

This invention proposes an Apparatus 100 and Method of Operation for inherently low-complexity and low-cost topology mm-wave radar sensor, targeting as a major application field vehicle parking support.

Apparatus 100 and its method of operation provide the following operations features:

1. Detection of the obstacle distance;
2. Detection of the angle toward the obstacle;
3. Optional ability to determine whether the obstacle is a living being, like a human or animal;
4. Ability to be integrated in vehicle bumpers, being unnoticeable, in contrast to ultrasound sensor systems;
5. Ability to have the complete apparatus size with antennae, analog IC parts and digital parts less than 10 mm×10 mm×5 mm in size;
6. Optional improvement of the distance and accuracy toward obstacles by collaborative information processing of more than one Apparatus 100 systems, used on the same platform.

For the abovementioned features 1-3 all necessary calculation measures may be performed by Apparatus 100 itself, without the need to use, as today is the case in ultrasound sensor systems, the processing power of additional vehicle calculation entity.

The choice to use the mm-wave frequency band (30 GHz to 300 GHz) and advantageously to use 60 GHz band is mainly related to the size of the antenna system, allowing small and compact device, despite the fact that high-gain antenna with more than one radiation element is used. Millimeter-wave front end preferably operates in:

- 77-81 GHz automotive regulatory dedicated mm-wave band;
- 60 GHz ISM Band, under short-range device regulation, allowing the worldwide usage without dedicated frequency band allocation;
- Higher ISM band mm-Wave ranges.

The proposed system has a technical capability and specific method of operation to combine three different operation modes:

a) Mode one: Detection of the distance to obstacles using FMCW radar type of the operation, where the apparatus transmits and receives the frequency ramped signal, with the bandwidth between 500 MHz and 4 GHz, with an option to extend the PLL and VCO bandwidth to 10 GHz.

b) Mode two: In this mode the proposed apparatus is working in CW Mode, in a dedicated frequency within the frequency band of Apparatus 100 operation. One antenna is transmitting and two antennae are receiving the reflected signal. Those reflected signals are linearly combined and fed, without down conversion, to the N power detectors, where N is an integer number, larger than 1. The power detector values and relative values of the power detector outputs are processed by low computational efforts in entity 40, in order to calculate the obstacle angle relative to the front plane of Apparatus 100. The linear combination of the received signals contain amplitude changes and phase shifts, realized by the plurality of the approaches and realization options by passive means option, active means options or the combination thereof.

c) Optional mode three: In this mode the proposed Apparatus works in CW Doppler Mode, in a dedicated frequency within the frequency band of Apparatus 100 operation. One antenna is transmitting 22 and one antenna 211 is receiving the reflected signal. In the Digital processing entity 40, the signal is analyzed in order to detect the possible vibrations related to the detection of a living being. Breathing or heartbeats may be analyzed, taking into account the information about distance to the object.

d) Optional mode four: In this mode more than one Apparatus 100 system is considered to be integrated in the vehicle, typically in the vehicle bumper. If the information about obstacle angles is provided by more than one sensor, this information may be used for the recalculation of the distance to the object and to correct the accuracy of the distance detection.

e) Optional mode five: In this mode more than one Apparatus 100 system is considered to be integrated in the vehicle, typically in the vehicle bumper, with their operation coordinated by the additional computation and control unit, that may be part of the vehicle's computer system application portfolio, where the physical connection to the external entity is realized by connection options 60. We may recognize following sub-option controlling procedures:
   - Different Apparatuses 100, integrated in the same vehicle platform, to be operating in different time slots, by operating in FMCW mode for distance detection.
   - Different Apparatuses 100, integrated in the same vehicle platform, to be operating on different frequencies being related to Operation Mode 2 and Operation mode 4.
   - Different Apparatuses 100, integrated in the same vehicle platform, operating on same frequencies being related to Operation Mode 2 and Operation Mode 4, where one of the Apparatuses 100 are transmitting CW signals and different Apparatuses 100 are receiving reflected signals and the position of the object is detected by the information of at least two receiving apparatuses and enhanced in accuracy by more than two receiving apparatuses 100.

f) Mode six: In this mode more than one Apparatus 101 system is considered to be integrated in the vehicle, typically in the vehicle bumper and their operation is coordinated by the additional computation and control unit, that may be part of the vehicle computer system application portfolio, where the physical connection to the external entity is realized by 60 connection options.
   - Different apparatuses 101, being integrated in the same vehicle platform, are working in the same pre-defined set of frequencies, where one of the Apparatuses 101 is transmitting CW signals and different Apparatuses 101 are receiving reflected signals and the position of the object is detected by the information of at least two receiver apparatuses 101, enhanced in accuracy by more than two receiving apparatuses 101.

The key system relevant components of the proposed apparatus 100 are:

- Planar antenna system, realized by a plurality of technologies and approaches, with one transmitting 22 antenna and two receiving parts 211 and 212.
- Millimeter-wave radar with integrated front end on silicon 10, System on Chip, analog processing of the mm-wave signal, where the following entities are included:
   - Linear signal combining entity 213;
   - N power detectors: 214-215, where N may take values of 1, 2 or more;
   - Fractional N PLL—Phase Locked Loop, providing ability to generate multi GHz ramp frequency sweep signal and signal frequency in band of operation;

VCO Voltage Control Oscillator entity and frequency divider to provide signal for PLL;

PA Power Amplifier with PA power control feeding TX antenna 22;

Mixer for down conversion of the signals;

Signal conditioning blocks, providing signal filtering and power amplification to get the proper power level values for interfaces ADC converter 30, without external conditioning components;

DC Voltage regulator and circuit biasing;

Test circuitry for integrated IC, operation, production and functional safety testing;

Calibration entity with digital and analog means, to influence and adjust the performance on analog parts in case of semiconductor process variations and temperature;

Digital interface to digital processing entity 40 and control functionality 41, which is realized by SPI protocol standard;

DC supply connections;

Antenna connections for receiving antennae 211, 212 and for transmit antenna 22;

Power Splitter;

Analog connections from signal conditioning entity and power detector entities 214, 215 to digital processing functionality 30.

Digital signal processing functionality 40, with at least two analog inputs, having a standardized physical digital interface 60, with a plurality of realizations; where entity 60 may contain one or more entities 61, 62, 63 or 64.

Mechanical assembly with power supply interface to power supply infrastructure, containing a mechanically integrated antenna, digital and analog functionalities.

Supporting circuitry 50 as a part of Apparatus 100 include functionalities like mechanical connections of Apparatus 100 to vehicle parts and optional environment protection structure to protect Apparatus 100.

The proposed apparatus and method of operation allows the production of the complete sensor system in the cost range significantly lower than 2€, per piece, for higher quantities, which is presented as one or more orders of magnitude cost difference compared to current state of the art solutions. This is only possible by using the proposed special integrated circuitry and antenna systems and specific semiconductor technology.

Innovative Apparatus 100 could be realized in simplified forms: as Apparatus 101, Apparatus 102*a* and Apparatus 102*b*.

If the parking support sensor is realized in a way that more than one Apparatus 100 is used on one side of the vehicle, in that case the complexity of Apparatus 100 may be dramatically reduced, by completely omitting the FMCW type of operation for distance detection and concentrating only on angular calculations. This means that if we have the angular information of the object obtained from more than one Apparatus 101, we may calculate its position and distance to the vehicle by simple calculation means. This means that no fractional N PLL is required, which requires a lot of space and complexity and also that there is no need for FMCW signals processing in signal processing units.

Proposed Apparatus 101 has a subset of the hardware complexity of Apparatus 100 and may be realized with significantly lower costs compared to Apparatus 100. However, it requires an additional vehicle calculation entity, which may be realized as an extra software application component of the vehicle's main computation unit. The system approach with Apparatus 101 does not offer optional features of living being detection by Doppler CW mode of operation.

The relevant key system components of the proposed apparatus 101 are:

Planar antenna system, realized by a plurality of technologies and approaches, with one transmitting 22 antenna and two receiving parts 211 and 212.

Millimeter-wave radar with integrated front end on silicon 10, System on Chip, analog processing of the mm-wave signal, where the following entities are included:

Linear signal combining entity 213;

N Power detectors: 214-215, where N may take values 1, 2 or more;

PLL—Phase Locked Loop, providing the ability to generate a CV signal in the band of operation;

VCO Voltage Control Oscillator entity and frequency divider to provide the signal for PLL;

PA Power Amplifier with PA power control feeding TX antenna 22;

DC Voltage regulator and circuit biasing;

Test circuitry for integrated IC operation, production and functional safety testing;

Calibration entity with digital and analog means, to influence and adjust the performance on analog parts, in case of semiconductor process and temperature variations;

Digital interface to digital processing entity 40 and control functionality 41, which is realized by SPI protocol standard;

DC supply connections;

Antenna connections to receiving antennae 211, 212 and for transmitting antenna 22;

Analog connections from signal conditioning entity and Power detector entities 214, 215 to digital processing functionality 30.

Digital signal processing functionality 40, with at least two analog inputs, having a standardized physical digital interface 60, with a plurality of realizations; where entity 60 may contain one or more entities 61, 62, 63 or 64.

Mechanical assembly with power supply interface to power supply infrastructure, containing a mechanically integrated antenna, digital and analog functionalities Supporting circuitry 50 as part of Apparatus 101 include functionalities like mechanical connections of Apparatus 101 to vehicle parts and optional environment protection structure to protect Apparatus 101.

Proposed Apparatus 101 may be realized in a way that the transmitting and receiving functionalities are separated, like in FIG. 8. In this case we are recognizing two Apparatuses: Apparatus 102*a* for the transmitting functionality and Apparatuses 102*b* for the receiving functionality. This approach allows for even lower system cost, meaning that for one side of the vehicle we may use one transmitter and several receiver options, meaning also that the silicon and complexity cost for each specific item is also reduced. So we would theoretically need one Apparatus 102*a* and two Apparatuses 102*b* for one side of the vehicle. By this approach each of the Apparatuses 102 have a reduced requirements for antennae, so the antenna structures may be advantageously released on the mm-wave chip, which may positively influence the sensor module cost by the reduction of the assembly cost.

BRIEF DESCRIPTION OF DRAWINGS

FIG. 14*a* shows the detectors outputs at the antenna 211 and 212** distance of 0.625 the wavelength.

FIG. 15*a* shows the detectors outputs at the antenna 211*a* and 212 distance of 0.625 of the wavelength. FIG. 15*a* shows the detectors outputs at the antenna 211 and 212**, where the antennae are placed at a distance of 0.75 the wavelength.

DESCRIPTION OF EMBODIMENTS

Figure 1:
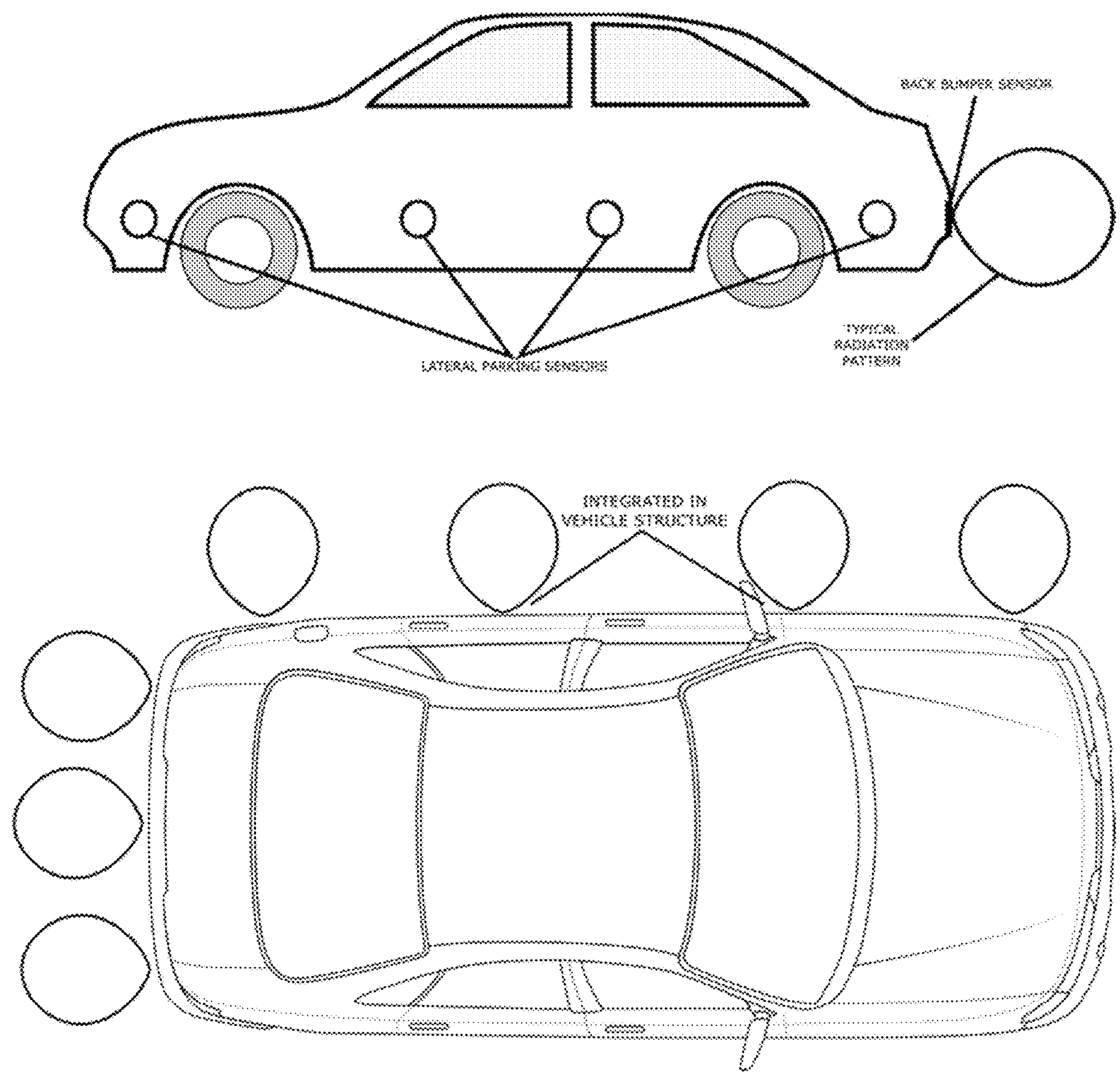
FIG. 1 presents the typical application scenarios for vehicle parking assistance using the proposed Apparatuses 100, 101, and 102*a* and 102*b*. The apparatuses are integrated in vehicle structures like bumpers and are not visible or recognizable by the human eye.
Figure 2:
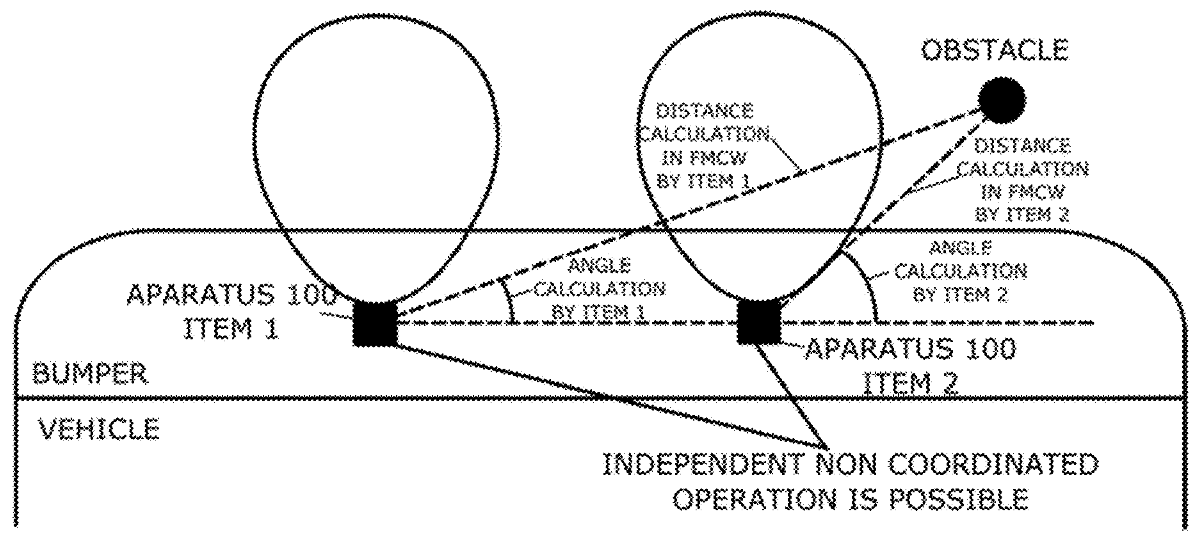
FIG. 2 presents application and operation scenarios for the proposed Apparatus 100.
Figure 3:
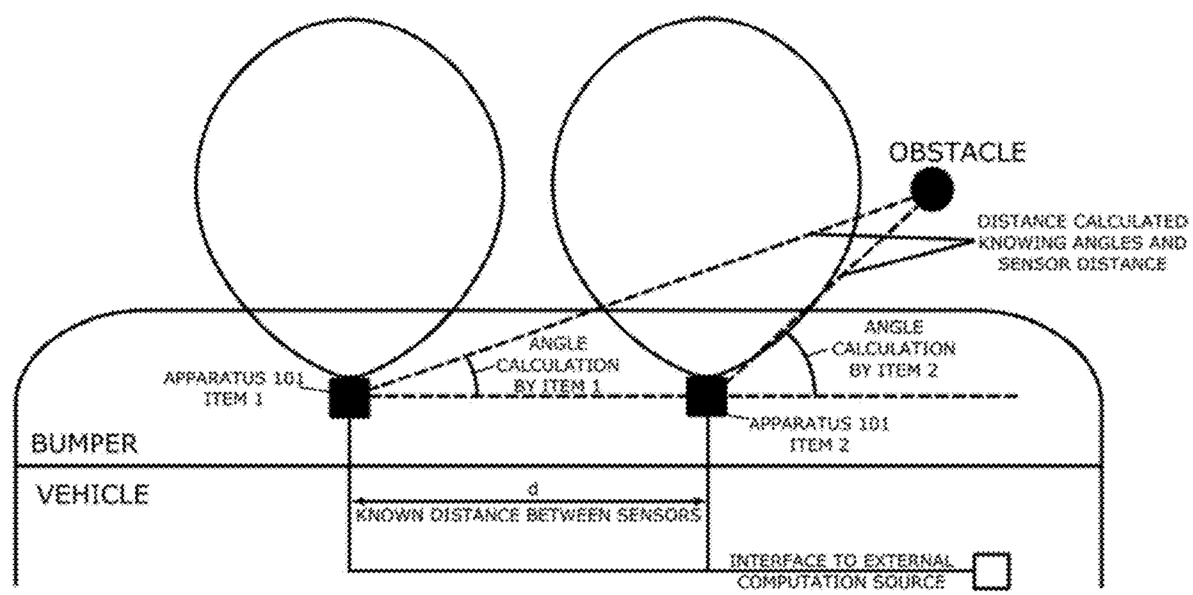
FIG. 3 presents application and operation scenarios for the proposed Apparatus 101.
Figure 4:
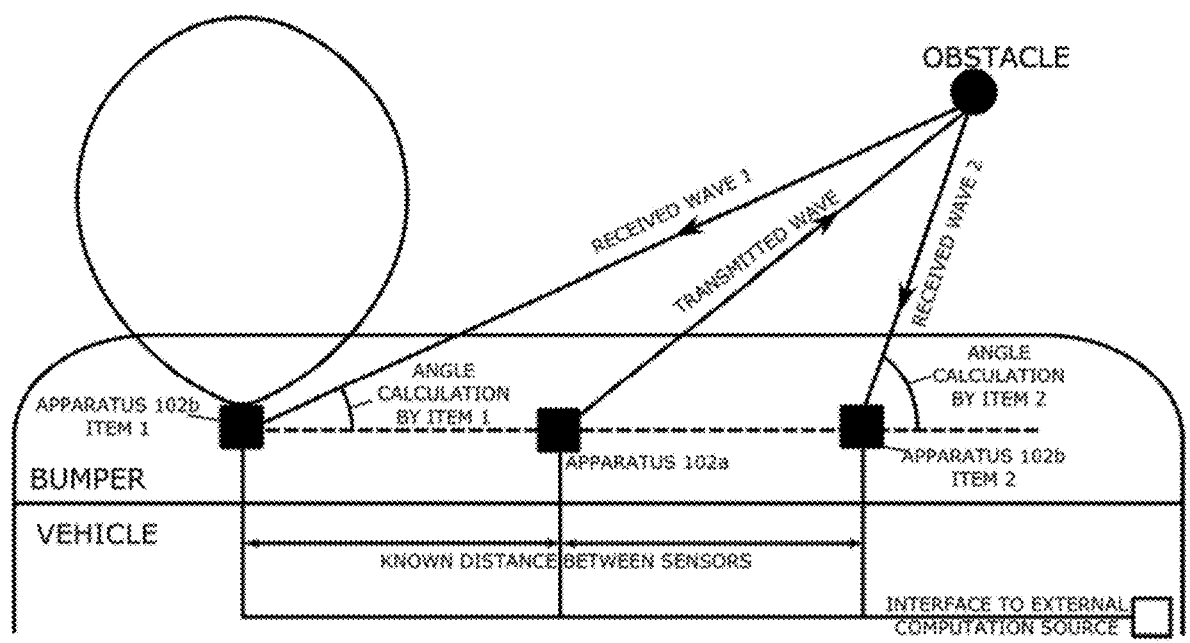
FIG. 4 presents application and operation scenarios for the proposed Apparatus **102*a* and Apparatus 102*b***.
Figure 5:
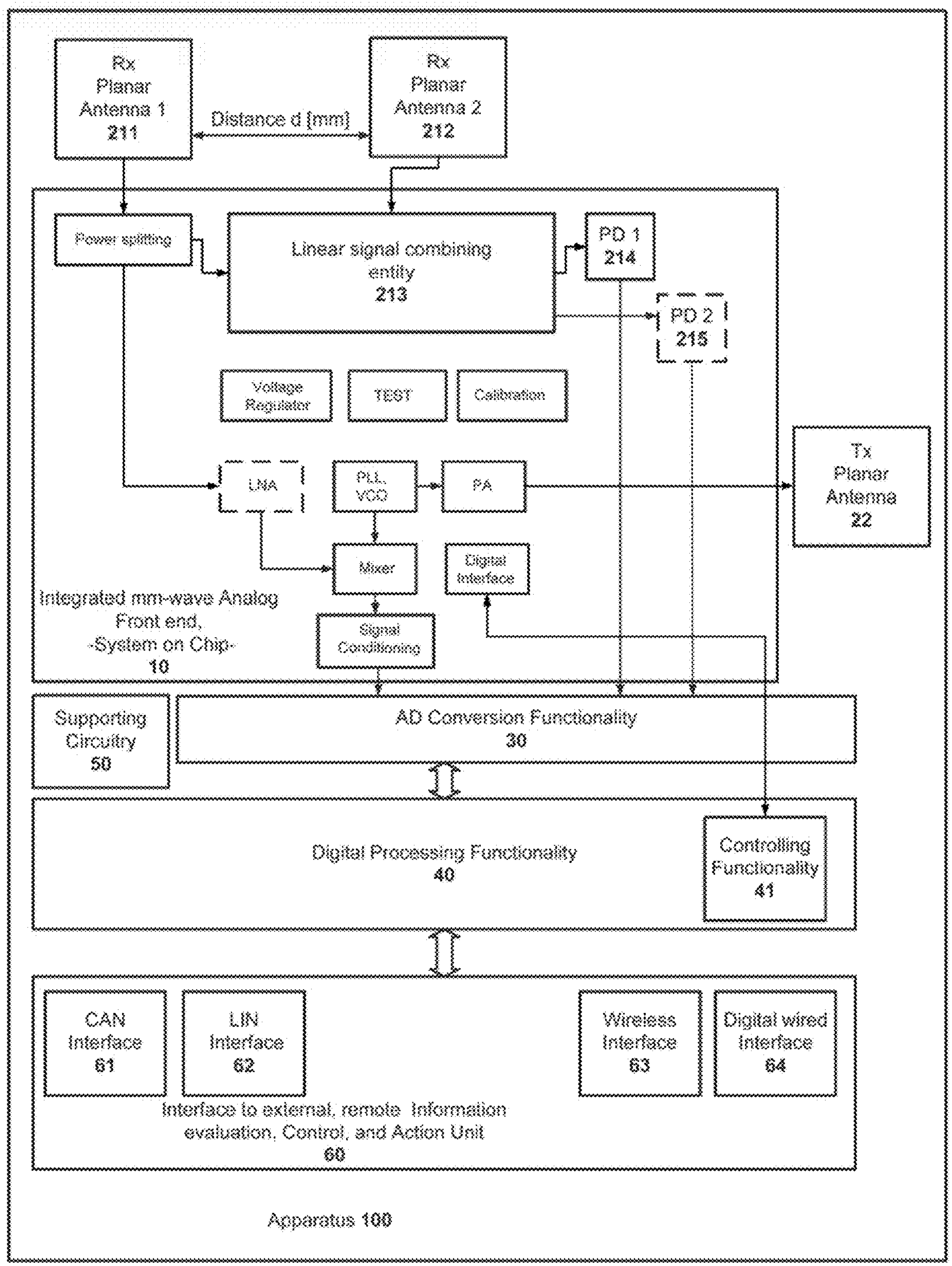
FIG. 5 presents Apparatus 100 functional block diagram.

The proposed apparatuses 100, 101, **102*a* and 102*b* perform calculation of the distance and angle of the obstacle. The Apparatus 100** allows additionally and optionally to explore the parking obstacles vibrations, being able to detect a living being, in case of vital signs detection.

Entity 100 enables three different modes of radar operation:

- FMCW operation for distance calculation
- CW mode for parking obstacle angle calculation, with sets of power detectors and optional
- Doppler type of operation in CW mode, for vibration detection.

The proposed invention has in entity 10 fractional N PLL being able to address the complete frequency band of operation, being regulatory allocated for the operation of the devices. In case of automotive frequency band 77-81 GHz, the PLL is addressing the full 4 GHz bandwidth, which allows high resolution bandwidth, also without special digital processing techniques. Through frequency ramp bandwidths of up to 10 GHz, in mm-wave frequency band, the resolution may be further improved and is practically realizable within entity 10, but would require a dedicated formal regulation approval for operation in a specific geographic location. The topology of the radar conversion chain has a down conversion mixer, where the frequency ramped VCO signal is mixed with the reflected signal and where the distance detection is realized using FMCW principles. The down converted signals is filtered in the way to cut the harmonics and the filter structure is shaped with dedicated predefined filter, of $M^{th}$ order, where M is higher than 3. In practice, $5^{th}$ Chebishef Low Pass filter is applied. The DC chain is followed by further signal conditioning circuitry, like a gain controlled low frequency amplifier, providing the signal in the right range to be acquired by entity 30 AD converter and further processed by entity 40, using FMCW state of art processing procedures. The power amplifier of entity 10, has gain control being arbitrary realized allowing operation in the complete band of interest, like the 77-81 GHz frequency band. The gain control is essential for the near object detection that appears in parking procedures.

In case of small distances, in the 5 cm range, the reflected signal may be too strong and may cause difficulties in the down conversion chain. Therefore the entity 10 does not have a low noise amplifier (LNA) structure, known in state of art FMCW radar systems. So the received signals are provided to the mixer without LNA. LNA has a problem with large signal handling.

The power amplifier gain control allows power level reduction of the transmitted signals, which will provide mixer structures to work without saturation. After down-conversion, the signal is passed through a conditioning circuitry to provide right signal magnitude range for the AD conversion functionality 30 and to be properly filtered.

There is a high probability that the radar parking sensors will be integrated inside in the vehicle environment like vehicle bumpers: front and rear area, as well as on vehicle side areas, inside bumpers or similar. The basic aim of the proposed invention is to provide radar sensor topology giving more operation and functional features compared to the commonly used ultrasound systems, by being invisibly embedded in the vehicle, in contrast to current parking sensor and having inherent capability to compete in the realization cost with ultrasound parking systems.

Proposed mm-wave sensor allows using around 9 times smaller antennae, compared to the microwave 24 GHz radar sensor, which are also used as state of art. It is assumed that the integration in vehicle bumpers should cause 5-7 dB of losses to cope with. It is assumed that the operation scenario requires significantly lower cost system approach, with small volume and to enable easy integration in the vehicle environment.

In contrast to vehicle long and middle range radar applications, the proposed approach is different in not requiring a steering antenna beam of high gain antenna approach. The system requirement however, would preferably consider less antenna bandwidth in elevation, due to radar reflections from the ground and more coverage bandwidth in azimuth. On the other side, the size of the antenna should be as small as possible to enable easy handling vehicle integration and low cost.

Figure 12:
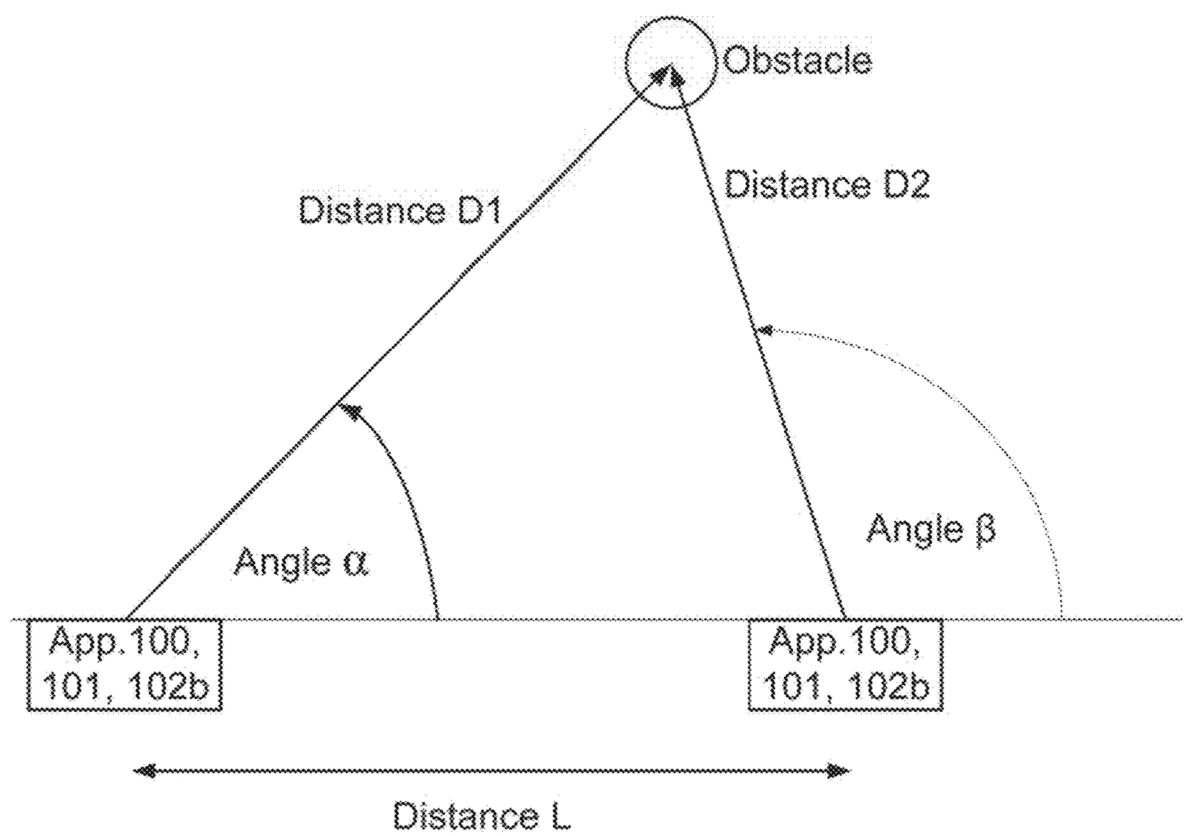
FIG. 12 presents obstacle distance detection approach using information about obstacle angles, by two Apparatuses 100, 101 or **102*b***.

So a tradeoff is proposed. It is proposed to have planar antenna structure, enabling easy integration in the apparatus itself, with one or two planar radiating elements. FIG. 12 shows a possible apparatus 100 or 101 realization option, where the transmit antenna is realized by two planar dipoles, being arranged such to provide in front of the apparatus more radiation beam width in azimuth and narrowed beam width in elevation, having the reflection metalized plate below the antennae, at approximately one quarter the operational bandwidth.

In general, PA level and related power control is chosen to cope with the:

Frequency operation at 77-81 GHz, coping with radar sensor automotive regulation Operation distance of 5 cm to 8 m With resolution bandwidth related to 4 GHz frequency ramp, allowing after processing resolution in cm range Environmental losses due to integration in the vehicle environment, like bumper, in the 5-7 dB range Tx and Rx Antenna gains in the range of 1 to 5 dB, depending on the number of used antenna elements Assembly transmission losses in antenna connection and feeding network of about 1-2 dB Power detector ranges are about 25-30 dB and they are used for obstacle angle detection This leads to PA power levels in the range of 0 dBm to 3 dBm and a power range adjustment capability of 25 to 30 dB.

The Apparatus 100 can detect the object's distance using FMCW principles and would need to calculate the object's angle. By switching to CW mode within the band of operation, the PA is sending a signal with the output power level adjusted by the provided received signal level at the antenna 211 and 212 outputs, that after linear combining and phase shifting of entity 213, can be detected by power detectors' 214 and 215 dynamic range.

The power detectors have a 25-30 dB range, by the plurality of realization options. Detectors 214 and 215 comprise of envelope detection, followed by low pass filter and signal conditioning circuits to provide a related power level, digitalized by the AD converter entity 30. Similar power detectors may be attached to the transmitting part, to ensure the calculation of the transmitted signal level, for functional safety reasons, or to evaluate the reflected signal levels from the transmitting antenna, which may be larger, in case of non-ideal connection to the antenna system 22.

The state of the art systems for determining the direction of arrival, usually down-convert the incoming signal from different antennae and execute a complicated mathematical computation in baseband, in order to calculate the angle. Also, in case of long and middle range radar systems, the angles are calculated by using 4 Rx down-converted channels, with 4 antennae, 4 down conversion mixers, 4 signal conditioning circuitries and 4 AD converters. This setup requires a larger chip size and a larger complete sensor system.

Figure 11:
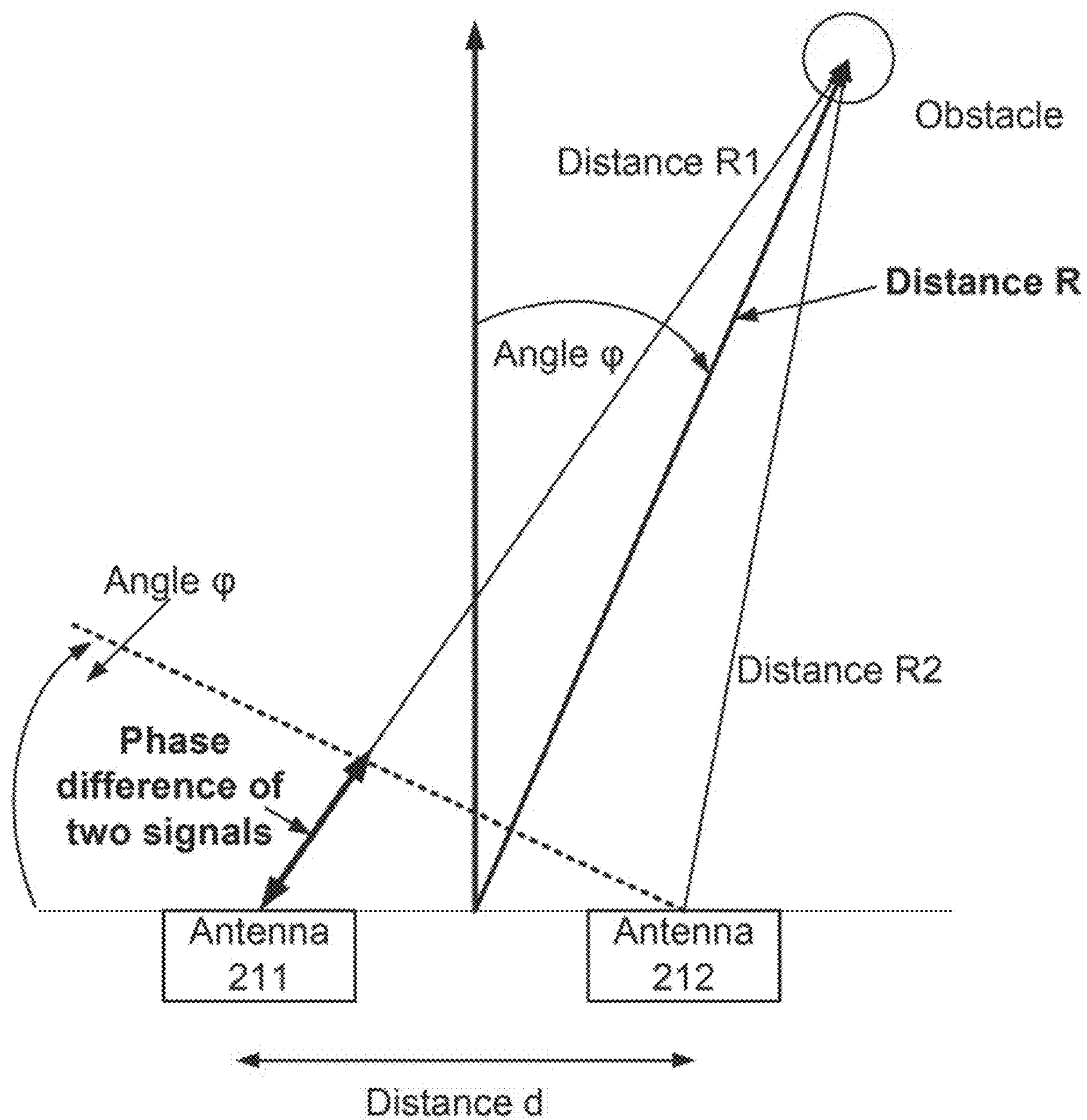
FIG. 11 presents obstacle angle detection topology using 211 and 212 antennae.

The basic proposed innovative approach, is to use only two receiving antennae, 211 and 212, N power detectors, where N may take the integer values larger than zero, a linear combining entity 213 and no down-conversion chains. In FIG. 11 one operation scenario is shown with the obstacle in a specific angle related to the two receiving antennae, 211 and 212. Due to a small distance between the receiving antennae, compared to the distance to the object, it is assumed that the incoming signal levels are approximately same and two received signals have phase shifts being related to the angle to the obstacle. The angles to the obstacle from each of the antennae may be considered equal to the angle in their geometrical center. The phase difference is related to the distance between the antennae and the frequency of operation. It is assumed that the radiation diagram of both antennae for the same angle is same.

$$phaseDifference = \beta(R_2 - R_1) = 2\pi\frac{f}{c}d\sin(\phi) \tag{1}$$

the angle $\phi$ takes the values:

$$-\frac{\pi}{2} \le \phi < \frac{\pi}{2} \tag{2}$$

meaning that:

$$-1 \le \sin(\phi) \le 1 \tag{3}$$

This means that if we have the value of $$2\pi\frac{f}{c}d\sin(\phi),$$

we may explicitly calculate the angle $\phi$.

Figure 6:
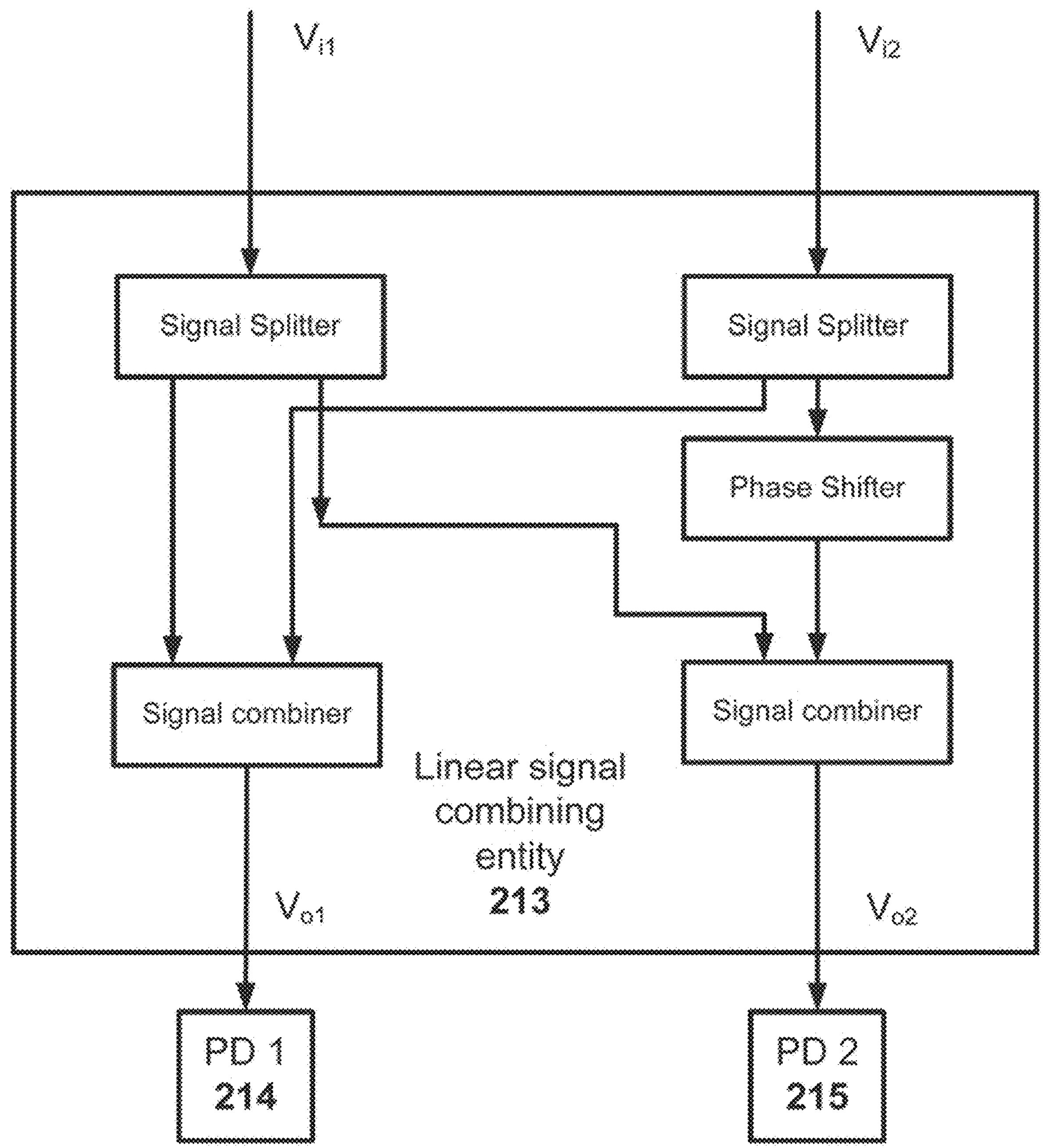
FIG. 6 presents the entity 213 realization option.
Figure 7:
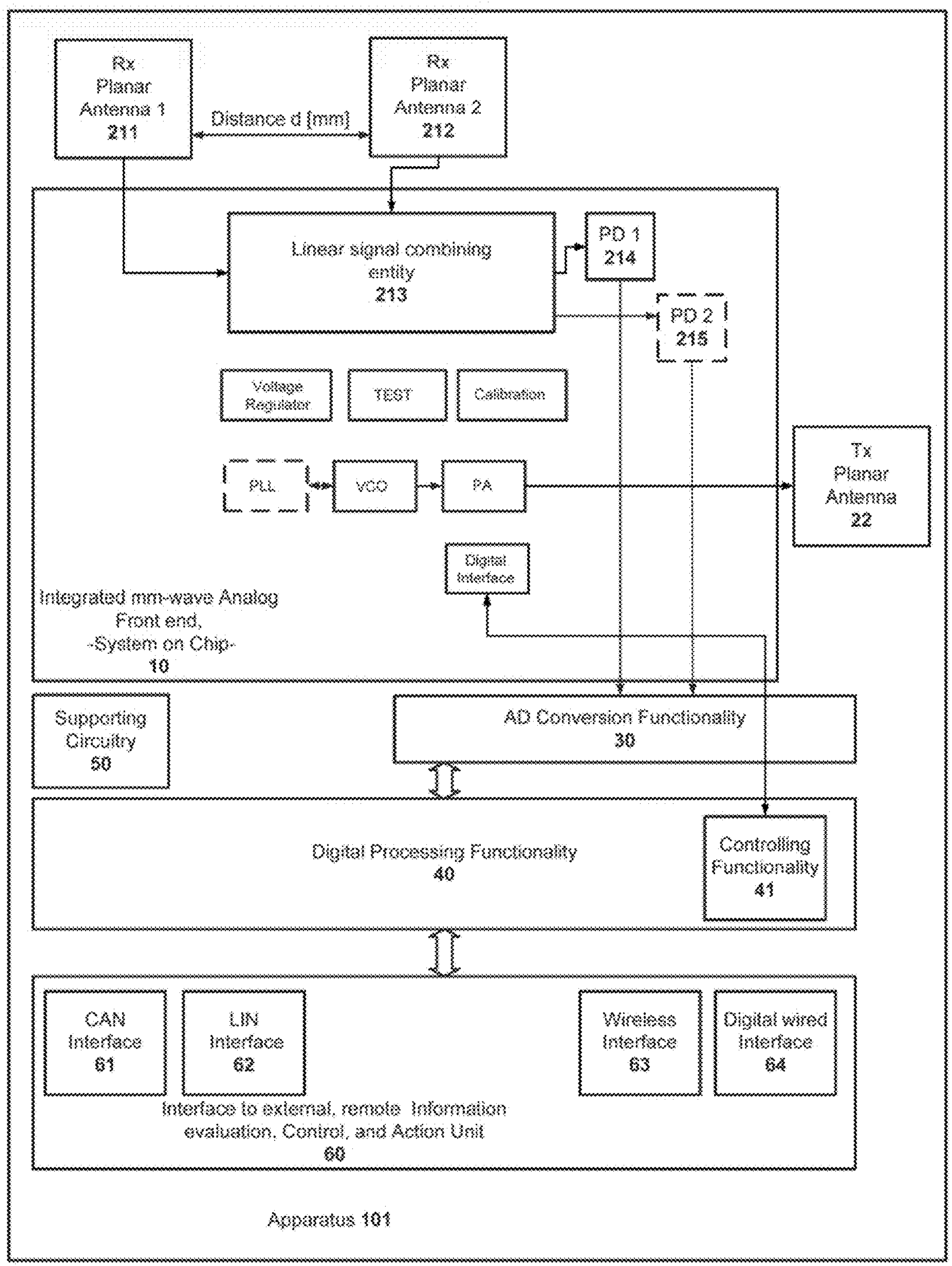
FIG. 7 presents Apparatus 101 functional block diagram.
Figure 8:
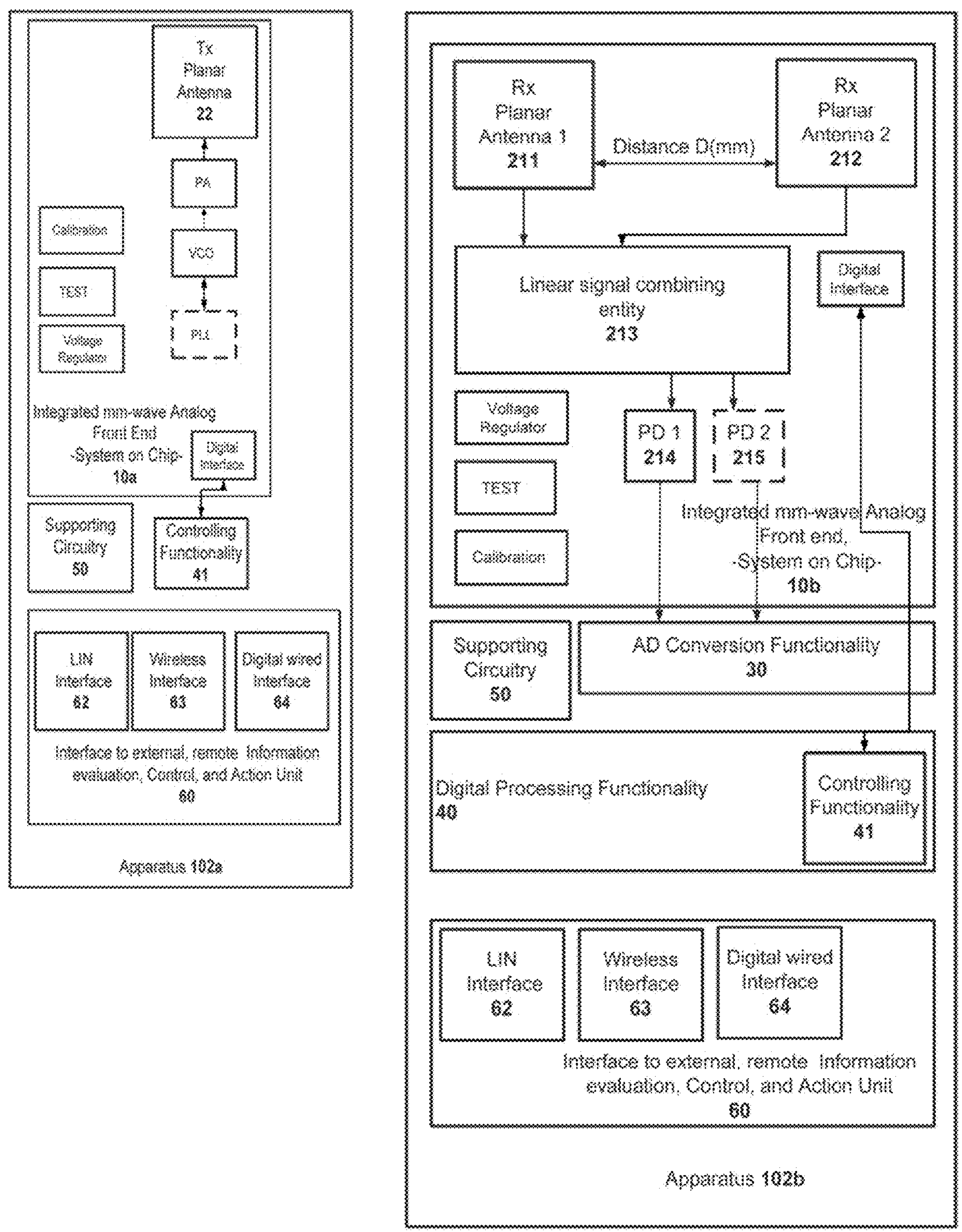
FIG. 8 presents Apparatuses **102*a* and 102*b*** functional block diagrams.
Figure 9:
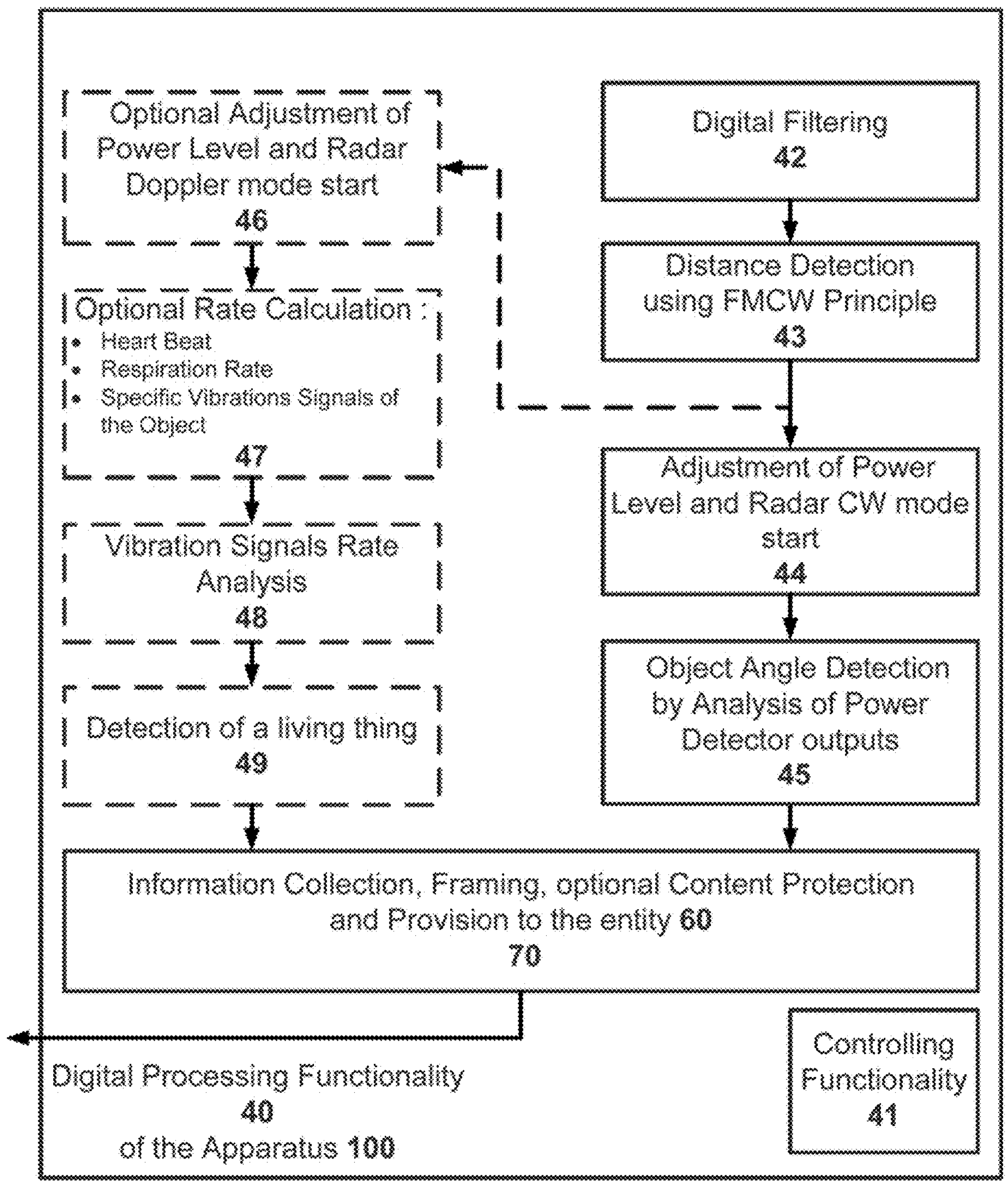
FIG. 9 presents Apparatus 100 digital processing functional blocks.
Figure 10:
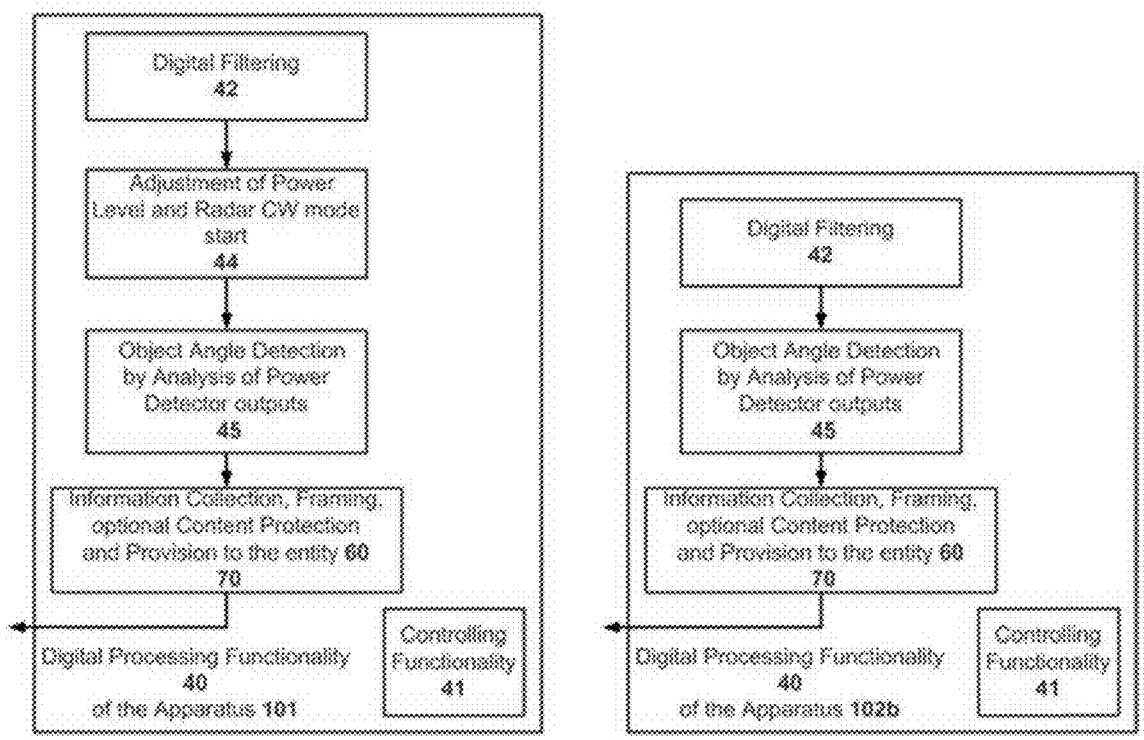
FIG. 10 presents Apparatus 101 and **102*b*** digital processing functional blocks.

Let us observe the entity 213. The linear combination of the signals may be realized by a simple topology that includes the addition of the signals and the addition of the signals where one of the signals additionally has a phase shift of 90 degrees, related to the frequency of operation. Power combiners and phase shifters are realized by the plurality of realization options, using active and passive means on the integrated mm-wave circuit 10. A simple and straight-forward realization option is to have two passive power combiners and one passive phase shifter, as shown in FIG. 6.

Following this approach we will have two signals at the input of the power detectors 214 and 215.

$$V_{o1} = V_{i1} + V_{i2} = 1 + e^{j(\beta d\sin\phi)} \tag{4}$$

$$V_{o2} = V_{i1} + V_{i2}e^{j\frac{\pi}{2}} = 1 + e^{j(\frac{\pi}{2}+\beta d\sin\phi)} \tag{5}$$

The power of the signals is then, using power detectors, converted to voltages and these two values are used for the calculation of the angle.

Let us observe the Apparatus 100 topology first. The signal of the first receiving antenna 211 is split by the power splitter. One part of the signal is provided to entity 213. We are assuming that the signal is divided in equal measures of power by the power splitter, being realized by the plurality of realization options. On the other side, the signal from antenna 212 comes directly to entity 213. In that case, we will have two detected voltages after ideal power detectors.

$$V_{PD1}[V] = |V_{comb1}|^2 = \left|\frac{1}{2} + \frac{1}{\sqrt{2}}e^{j\beta d\sin\phi}\right|^2 = \ldots = \frac{3}{4} + \frac{1}{\sqrt{2}}\cos(\beta d\sin\phi) \tag{6}$$

$$V_{PD2}[V] = |V_{comb2}|^2 = \left|\frac{1}{2} + \frac{1}{\sqrt{2}}e^{j(\frac{\pi}{2}+\beta d\sin\phi)}\right|^2 = \ldots = \frac{3}{4} - \frac{1}{\sqrt{2}}\sin(\beta d\sin\phi) \tag{7}$$

Following simple mathematical operations, we are able to calculate the angle $\varphi$ in (8)

$$\phi = \operatorname{asin}\left(\frac{\lambda}{2\pi d}\operatorname{atan}\frac{0.75 - V_{PDZ}}{V_{PD1} - 0.75}\right) \tag{8}$$

The inverse tangent function in (8) gives unambiguous angle in the range of $[0, 2\pi)$. The inverse sinus is unambiguous because we know its argument is in the range of $[-\pi/2, \pi/2)$. Equation (8) is calculated by arbitrarily numerical means in digital domain after AD conversion in 30.

Practical realization of (8) is driven by the use of simplest calculation efforts, preserving the necessary accuracy of the results and taking into account the imperfections of the subsystems. Examples: CORDIC algorithm or Taylor series.

There is no point in increasing the accuracy of the signal processing when the system itself has imperfections. However, the propagation of errors plays a significant role to the overall accuracy of the detected angle. The angle calculation may be performed by Apparatus 100, while values (6) and (7) may be transferred in digital form to the vehicle's external computational unit, together with the identification of the dedicated Apparatus 100 ID. The external computational unit will then calculate the angles to the obstacle being seen by the dedicated different instances of Apparatus 100 and process this information further, to the user interface.

Let us observe the apparatus 101 topology. The signal from the first receiving antenna 211 and the signal from the antenna 212, are processed by the entity 213. In that case, we will have two detected voltages by the ideal power detectors.

$$V_{PD1}[V] = |V_{comb1}|^2 = \left|\frac{1}{\sqrt{2}} + \frac{1}{\sqrt{2}}e^{j\beta d\sin\phi}\right|^2 = \ldots = 1 + \cos(\beta d\sin\phi) \tag{9}$$

$$V_{PD2}[V] = |V_{comb2}|^2 = \left|\frac{1}{\sqrt{2}} + \frac{1}{\sqrt{2}}e^{j\left(\frac{\pi}{2} + \beta d\sin\phi\right)}\right|^2 = \ldots = 1 - \sin(\beta d\sin\phi) \tag{10}$$

Following simple mathematical operations, we are able to calculate the angle ϕ, in (11)

$$\phi = \operatorname{asin}\left(\frac{\lambda}{2\pi d}\operatorname{atan}\frac{1 - V_{PDZ}}{V_{PD1} - 1}\right) \tag{11}$$

The same means of calculation and other constraints in (9), (10) and (11) are taken into account as for the equations (6), (7) and (8).

Figure 14:
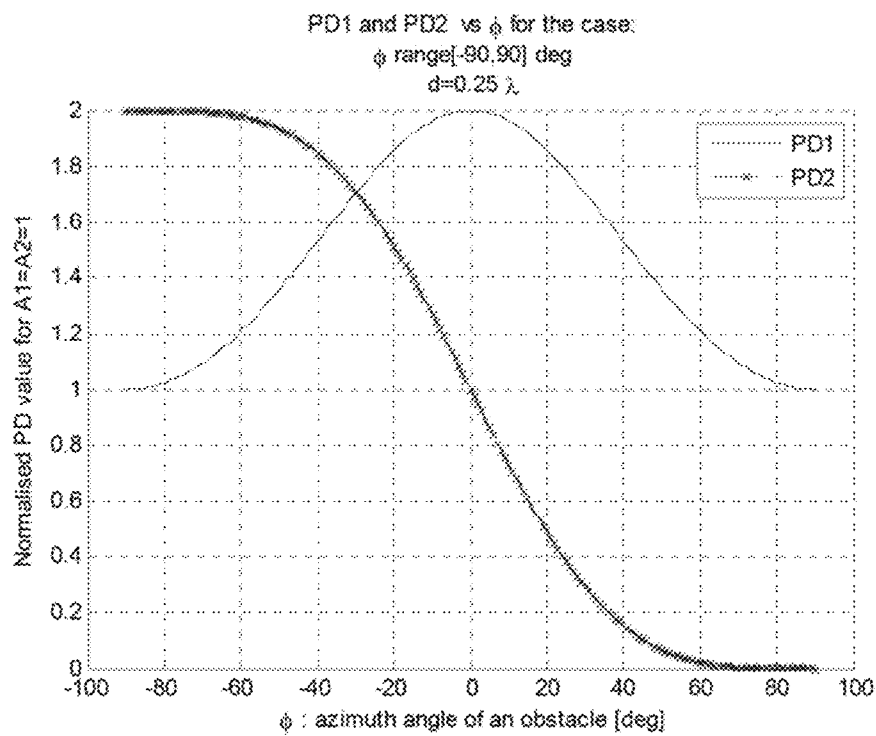
FIG. 14 presents power detector levels of 214 noted as PD1, and 215 noted as PD2 in apparatus topology 100. FIG. **14*a* shows the detectors outputs at the antennae 211 and 212, distance of one quarter the wavelength.
Figure 14:
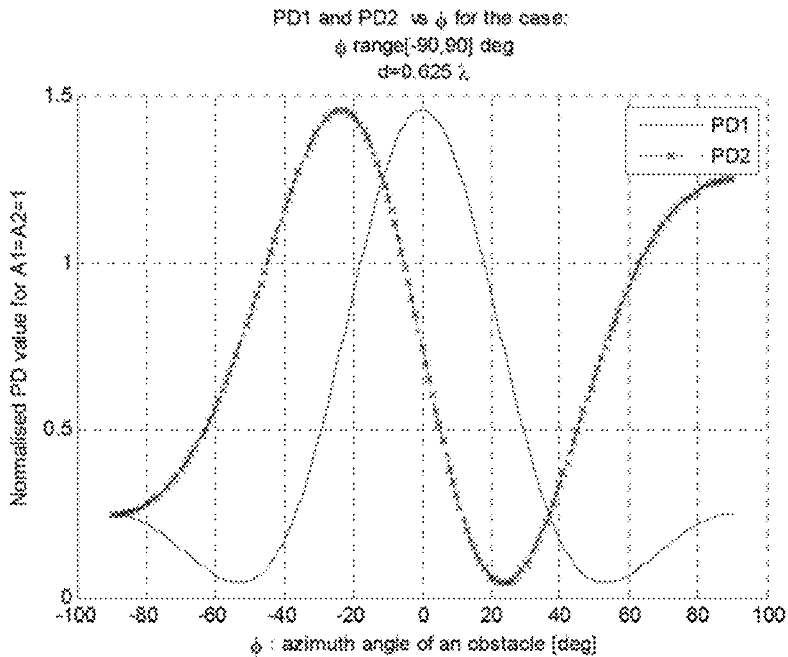

If we look at the function arguments of (6) and (7), as well as (9) and (10) we notice that the ratio: (distance between two receiver antennae 211 and 212) over (wavelength) influences the detectable ϕ. So, we may see from figures FIG. 14 and FIG. 15, that if the distance between the antennae is one quarter the wavelength, we may work only with one power detector, covering the full range of angle ϕ, −π/2 to π/2. Theoretically, if we have the minimum distance between antennae 212 and 211 we will have the smallest possible apparatuses 100, 101 and 102*b*. Practically, our antenna systems have finite dimensions and their centers can hardly be positioned at distances of one quarter the wavelength.

Figure 13A:
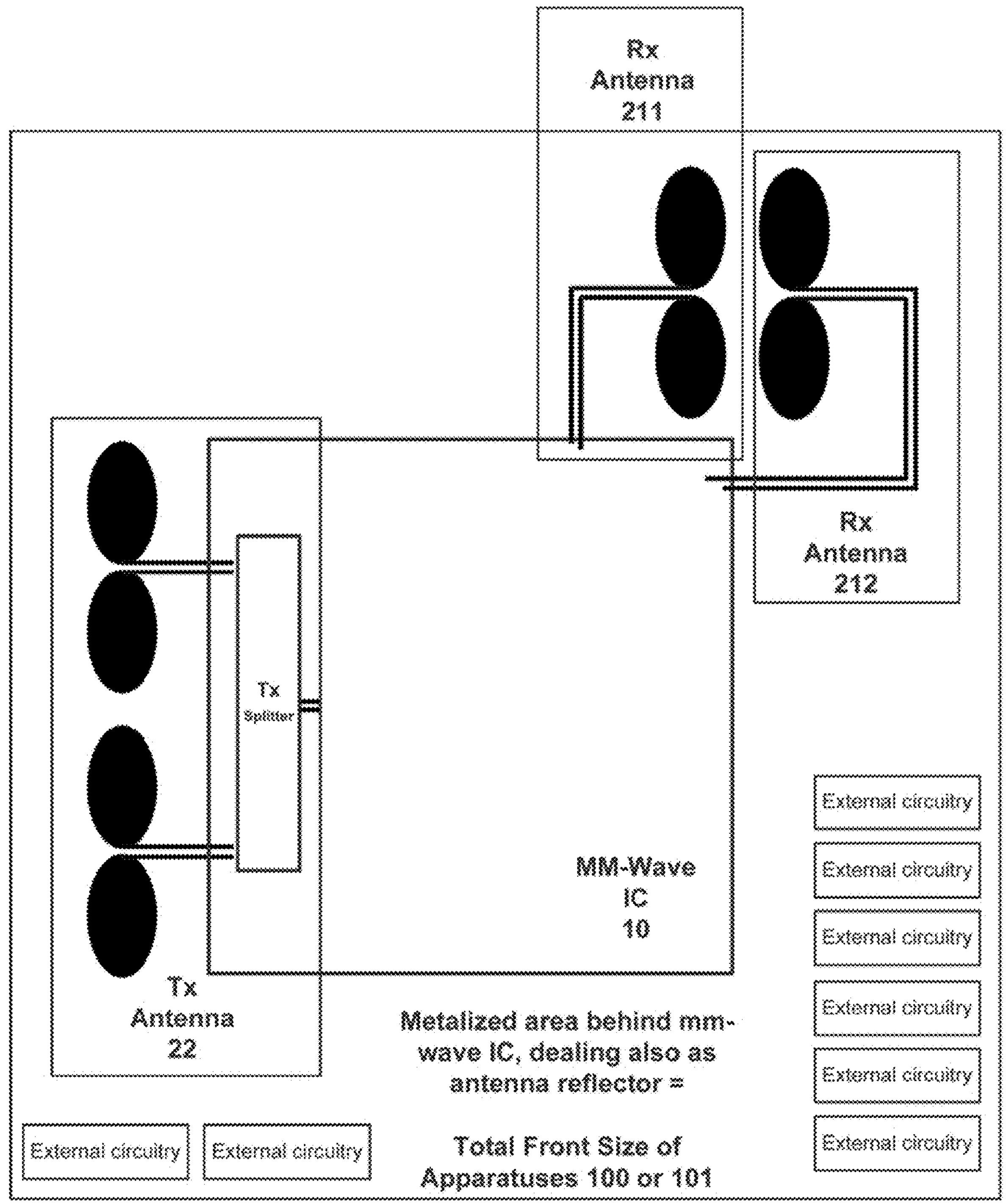
FIG. 13 presents the Apparatus 100 or 101 realization option, using polymers or LTCC approach: FIG. **13*a* top view, FIG. 13*b*** lateral view.

The proposed planar antenna systems may be realized by the plurality of technologies. If the micro strip technologies are addressed, the planar antenna itself has the thickness in the range less than one quarter the wavelength, so two such antennae being positioned close, would almost touch themselves by one quarter the wavelength distance between their centers. On the other hand, the mechanical tolerances of the antennae and the need to have a good yield, requires that those microstrip antennae should be designed to have a larger operational bandwidth, which means even a larger size. So if we use the dipole based planar antennae with reflector as proposed in FIG. 13, we need to deal with planar antennae, which are not as thick as microstrip type antennae. That is why we are proposing to use the dipole like planar antennae, being realized by the plurality of topologies.

Moreover, according to the analysis of user scenarios, we are addressing the radiation diagrams where the angle ϕ is usually less than 60 degrees. Having this information, we may conclude that if we have the distance of 0.625 between the antennae, we may recover the angles ϕ in the range of +/−55 degrees, which is sufficiently good to realize the printed antenna system. If we are targeting to cover +/−40 degrees only, our maximum distance between antennae 211 and 212 may increase and allow better practical realization.

The aim of the this innovation is to introduce apparatuses 100, 101 and 102*b* as small in size as possible, to detect the angle of the obstacle, by introducing only two receiving antennae, in contrast to state of art, where more than two receiving antennae are used. In long range automotive radar sensor state of art solution, 4 antennae in two by two antenna system arrangement are used for angle detection.

The smaller possible apparatus with only two receiving antenna systems for the detection of obstacle means also:

- Smaller size of the analog mm-wave circuitry, meaning lower cost of entity 10, with, due to lower complexity, larger yield. This decreases the system cost.
- Smaller size apparatuses, meaning lower system cost and easy integration in the enclosure, which is an obvious advantage.

Figure 15:
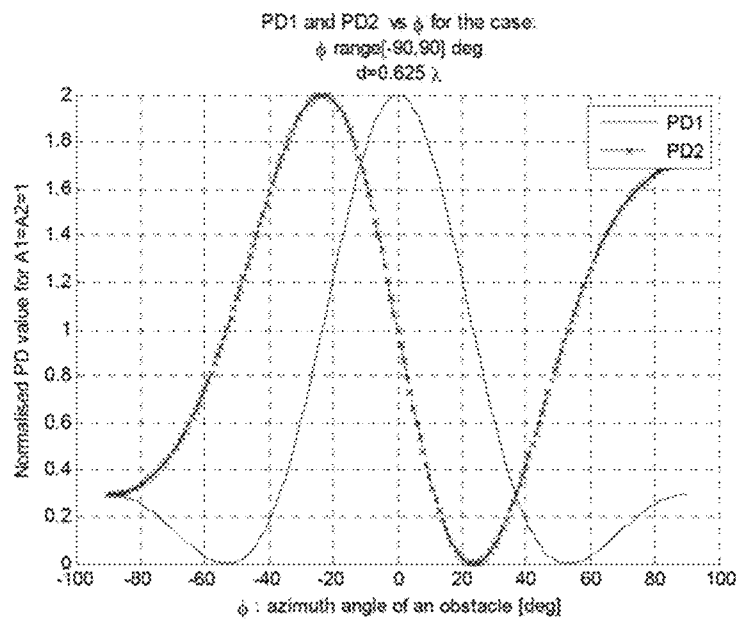
FIG. 15 presents power detector levels of 214 noted as PD1 and 215 noted as PD2 in apparatus topology 101 and **102*b*.
Figure 15:
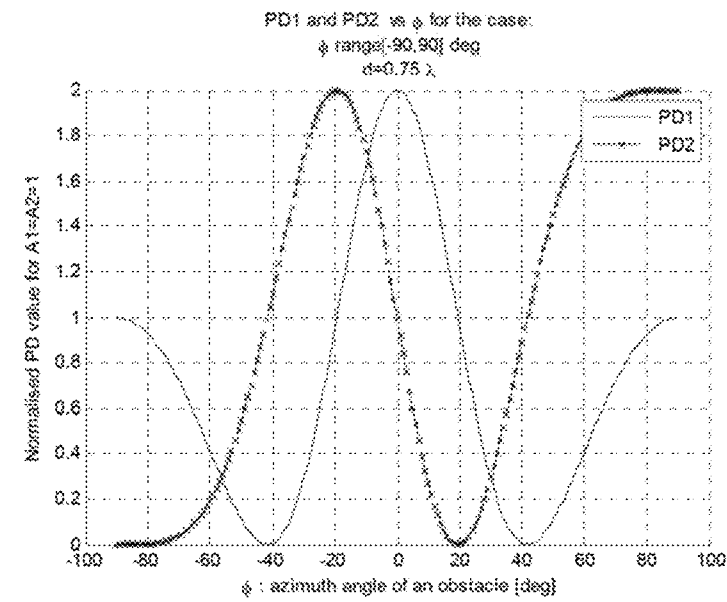

Only two receiving antennae system means reduced requirements for the AD convertor entity 30 and lower requirements for digital signal processing 40 entity, as well as interface 60. This means lower cost and also the possibility to integrate the entities 10, 30, 40 and 60 with less risk on the same silicon chip, using CMOS technology, or, on other the hand, it will be easier to integrate them on the same package. In FIG. 15 and FIG. 16, the power level outputs are presented using the above equations and topologies of 100 and 101/102*b*, respectively.

FIG. 14*a* shows the power detectors outputs at the distance of one quarter the wavelength. It may be observed that complete angle of +/−90 degrees may be detected by only one power detector; only PD2 is theoretically required to calculate, in a simple way, the angle of the obstacle. However, having said this, the distance is too small and hard to be practically realized.

FIG. 14*b* shows the power detectors outputs with larger distances between receiving antennae of about 0.625 the wavelength, which is easier to be practically realized and it confirms that the angles of about +/−55 degrees may be detected in a simple way.

FIG. 15*a* addresses apparatus 101 and 102*b* topology, with a distance between receiving antennae of about 0.625 the wavelength, ensuring detection angles of about +/−55 degrees.

FIG. 15*b* shows power detector outputs with distance between receiving antennae of about 0.75 the wavelength, ensuring detection angles of about +/−40 degrees. Due to the fact that the practical radiation diagram of the antenna in azimuth for the parking sensor is not exceeding this range, this distance may be practically used. From theory of high gain antenna synthesis, we know that the distance between radiation elements is in this range and the antenna systems can be practically realized.

FIG. 12 shows the basic principle of calculation of the distance to the bumper, by having the information about two angles, being previously calculated by two apparatuses with known distances.

Angles α and β are unambiguously obtained as previously described.

This idea allows for accuracy increase of distance calculation to the object being performed by the FMCW principle operation part of the Apparatus 100, or if we have two distances being calculated by the apparatuses, to calculate the position of the obstacle or indirectly the angles.

The distance of the obstacle from the bumper is:

$$H = \frac{L}{\cot(\alpha) + \cot(\beta)}, \text{ for: } 0 \le \alpha, \beta < \frac{\pi}{2} \tag{12}$$

$$H = \frac{L}{\cot(\pi - \alpha) + \cot(\beta)}, \text{ for: } \frac{\pi}{2} \le \alpha < \pi \text{ and } 0 \le \beta < \frac{\pi}{2}$$

$$H = \frac{L}{\cot(\alpha) + \cot(\pi - \beta)}, \text{ for: } 0 \le \alpha < \frac{\pi}{2} \text{ and } \frac{\pi}{2} \le \beta < \pi$$

$$H = \frac{L}{\cot(\pi - \alpha) + \cot(\pi - \beta)}, \text{ for: } \frac{\pi}{2} \le \alpha < \pi \text{ and } \frac{\pi}{2} \le \beta < \pi$$

Practical calculation of the equation may be performed by a plurality of methods, such as: CORDIC, Taylor series, other types of polynomial series, etc.

If we know the distances D1 and D2, having them calculated by FMCW principles, we may similarly calculate the distance H $$H = \sqrt{D_1^2 - \frac{(L^2 - D_2^2 + D_1^2)^2}{4L^2}} \tag{13}$$

The proposed apparatuses 101 and 102*b* do not have the FMCW radar calculation and may calculate the distance and position to the obstacles only by using information about the calculated angles. So they may be realized with a lower complexity.

If we have the information about angles or distances of more than two apparatuses, we may increase the accuracy by averaging the calculated distance, by averaging values from each of the two apparatuses. The enhancement may be realized omitting those calculations, where the angles with smaller calculation accuracy are not used or used with smaller weighting factors in the averaging process.

FIG. 13 shows the top and lateral view of the possible Apparatus 100 or Apparatus 101 practical realization options. Observing the top view, we notice the antenna system 22 for transmitting the signal and antenna systems 211 and 212 for receiving the signals. The transmit antenna systems 22 consist of two dipole antennae, aimed to be used in vertical polarization in the operation mode. Due to the fact that two antennae are positioned as shown, we will have a narrow band within the elevation of the bumper and wider antenna beam in the azimuth direction, fairly close to the current radiation of the ultrasound systems. The proposed dipole elements are realized in a planar way. Tx splitter and the antennae are realized in a way to have differential inputs from the mm-wave IC.

Differential topology of the mm-wave IC 10 has advantages compared to the single-end approaches used as state of the art in automotive radars. Dipole-like antennae are inherently prepared for differential feeding. Differential PA outputs minimizes the parasitic influences in the antenna connection and differential deployment may be used for easier compensation of the mm-wave front irregularities. MM-wave transitions to the mm-wave integrated front ends and antennae are the critical factor influencing direct cost of the system and production yield.

The single ended PA outputs require a good grounding, which is not easy to achieve by small structures and typically planar antennae, which are than deployed, are microstrip topology driven. This may require special substrates for the realization of the transmission lines, with special heights, which may increase the system cost. On the other side, the matching of microstrip like antennae are typically narrowband, so the manufacturing tolerances may influence the yield of the complete system in negative respect.

In case of dipole antenna topology, feeding network may be executed in more simple ways, due to the fact that the characteristic impedance of the parallel strips is mainly influenced by the distance between the strips and their width, rather that the substrate where the prints are printed or positioned. This may allow for use of lower cost assembly techniques in system integration, like those based on polymer technologies.

The radiation elements of the dipoles are presented in a generic way, showing that the radiation elements are realized as filled thicker shapes, meaning that they are inherently broadband.

The shape of one dipole part may be realized arbitrarily as an ellipsoid, as a rhomboid, as a pentagon and as n-tagons with axial symmetry, or the combination of n-tagons closer to the feeding point and an ellipsoid part in the upper part of the radiation element.

The differential Tx splitter is realized using arbitrary passive approaches and could be of same topology as the splitter used for providing VCO signals to the mixer and the PA in entity 10. In the top right side of FIG. 13*a*, the two antenna dipoles build antenna systems 211 and 212, are presented in a specific realization option. They are both operational with vertical polarization and have a specific distance. This distance plays an essential role in the detection of the angle being related to a specific obstacle. Both dipoles are fed in the same way as the transmitting antenna dipoles using symmetrical differential strip feeding. The characteristic impedance of the feeding structures is defined by the strip widths, related distance and material where the prints are positioned. The differential feeding lines are compensated in a way that there is no phase difference between the two lines, meaning that they act as if both lines are ideally of same length.

With altered topology of Apparatus 100 and Apparatus 101, the receiving antenna systems 211 and 212 may be realized in a similar way like the transmitting antenna system 22, by using two dipole elements and a power combining entity within entity 10. This would however require a larger apparatus size and higher cost, by having to cope with larger operational distances.

The top view of FIG. 12*a* shows that there is a place on the side of the mm-wave IC structures to connect dedicated external circuitry possibly related to specific biasing, filtering or protection needs and may impose active or passive components.

It may be observed that the surface of the mm-wave IC entity may be expected to be between 4 and 8 square millimeters, which in case of quadratic shape of entity 10, would imply sides of 2-3 mm in length.

The lateral view of the proposed Apparatus 100 and Apparatus 101 realization option shows different stacks of the apparatuses. On top of the apparatus we have printed antennae with their feeding network, omitted in the drawing, to present a clearer picture of the invention.

MM-wave IC has a height of less than 1 mm, such that on its back additional material may be added, if required, to ensure about 0.25 the main frequency wavelength (middle of the frequency band of operation), between the center of the printed antenna radiation elements and the metalized surface acting as a reflector. This enables the radiation direction through the bumper wall to the environment outside of the vehicle. A metalized surface could be printed on plastic materials or as part of the small PCB print.

Behind the metalized layers, denoted with bold lines, we may observe the packaged or unpackaged digital processing entity being realized as a custom ASIC or realized as a standard microcontroller or ARM processor. It is proposed that this entity contains the AD converters 30, digital processing functionality 40 and interface functionality 60. It is envisaged that the size of digital processing unit is in the range of 5×5×1 mm. This corresponds to current state of the art packaged microcontrollers having multiplexed AD converters and being capable of processing the three inputs required for the Apparatus 100 topology or the two inputs required for 101 and 102*b* topologies.

Additional external circuitry may be placed close to the Digital Processing Unit. This unit is connected to the mm-wave IC part, placed in the upper part of Apparatus 100 and Apparatus 101. The complete system is environmentally protected, meaning that it may easily be integrated in the bumper. Protected from humidity, dust and at the same time the mm-wave signals can easily pass through coating and protecting materials.

Figure 13B:
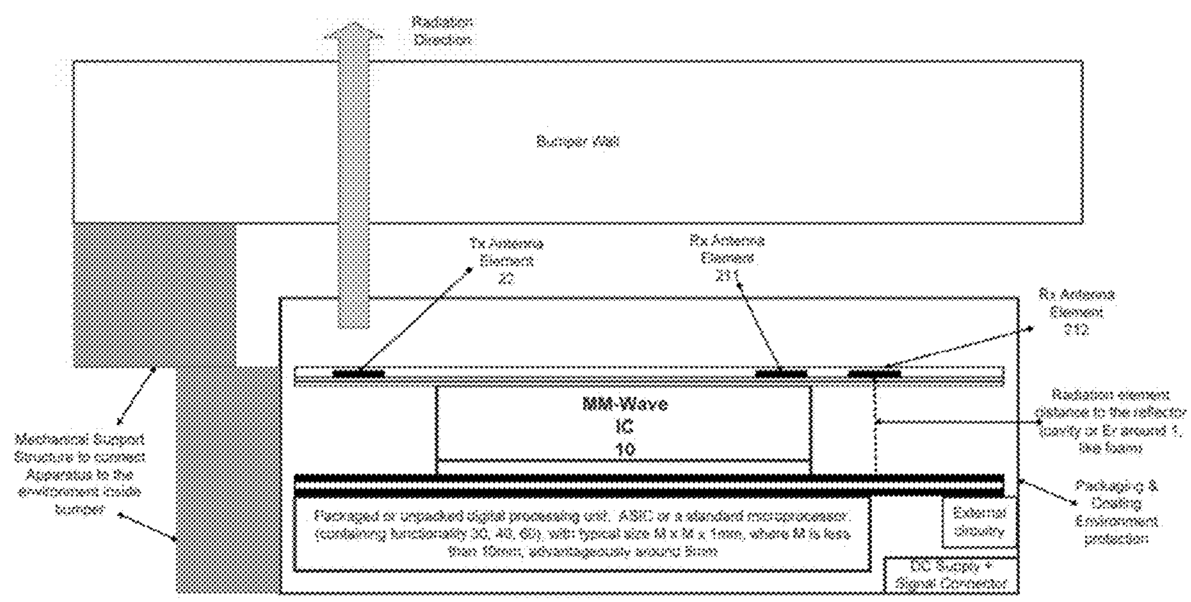

In the lower right corner of the apparatus in FIG. 13*b*, there is DC supply and signal connectors to cables connecting the apparatus to an external computational unit. The external computational vehicle unit could be part of the vehicle central computation unit, in order to provide:

Control of the apparatus operation, as well as

Assessment of results coming out the apparatus.

In other to optimize the total system cost containing more than one apparatus in the vehicle, it could be decided to perform the calculation of obstacle distances and angles by the apparatus itself in case of Apparatus 100. In that case, Apparatus 101 would need to send very small amount of data to the external vehicle computational unit. This will require a decent portion of mathematical calculations in the Digital Processing Unit, which would require more processing power and potentially more memory. This will increase the cost of the Digital Processing Unit and the apparatus itself. On the other hand, the Digital Processing Unit could perform a premature information handling and present it to the external computational unit. The information would need to be evaluated in the central vehicle's computational unit for all apparatuses connected to the system. In such case, more data needs to be transferred over the signal interface of the apparatuses and more data needs to be processed in the vehicle's computational unit. So system tradeoffs would need to be performed, in order to optimize the overall system cost. Less calculation on the digital processing size would allow better power dissipation handling within the apparatuses. It is however envisaged that the apparatuses will operate in low duty circle mode so that thermal dissipation should not be a problem.

In the left section of FIG. 13*b*, a mechanical support structure is presented. From one side, this structure is connected to the coated environment protection of the apparatus or is part of the package and is manufactured in the same process and time when the complete apparatus packaging is performed. The mechanical structure is also connected by arbitrary realization means to the inside wall of the bumper, providing enough mechanical stability. Ideally, the mechanic structure is not realized with metals, in order not to influence the antenna radiation diagrams.

Observation of the proposed topology as one of the possible realization options of the proposed invention, shows that the complete apparatus could be realized in a volume being smaller than 10×10×5 mm and that most likely the volume size of 7×7×3 mm would be sufficient. By realizing the antenna systems 211 and 212 in the similar way as antenna system 22, with two dipoles and combiners in 10, the size of the complete apparatus will increase.

The digital part typically includes arbitrary digital wired interface like: CAN and/or UN and/or SPI interfaces and/or proprietary digital interfaces, realized by the plurality of technologies, allowing easy connection to the world outside the Apparatus 100, with a cable connection. Due to cost pressure, it is likely that the CAN interface will be omitted and very low cost digital wireless interfaces will be deployed. The amount of data to be transmitted is low.

Means of short range wireless connection to the vehicle system 63 are optional.

The wireless short range communication interface 63 may be advantageously released by different wireless communication systems:

a) Short range communication system (typically up to 2 km) having one or more of these technologies:
   - Short range 433, 866, 915 MHz low data rate, used commonly worldwide in communication systems
   - WiFi, or other 2.4 GHz and 5 GHz Band communication systems up to 200 meters.
   - Bluetooth
   - UWB Systems
   - WiMAX at 3-4 GHz or in 2-3 GHz range The information from more than one Apparatus 100 system is gathered in a specific concentrator and then further communicated over long range communication means, by the plurality of their realizations.

The invention claimed is:

1. A parking sensor first apparatus and method of operation (100), where mm-wave declares operation between 30 GHz and 300 GHz, comprising of:

a planar antenna system for transmitting mm-wave radio signals (22);

a first planar antenna system for receiving mm-wave radio signals (211);

a second planar antenna system for receiving mm-wave radio signals (212), being at distance (d) from the first planar antenna system (211), perpendicular to the sensor observing area;

an integrated mm-wave radio front end (10), implemented in semiconductor technology, having on-chip integrated mm-wave voltage control oscillator (VCO), mm-wave power amplifier (PA), digital control interface, power supply; fractional N phase locked loop (PLL) enabling frequency modulated continues wave (FMCW) operation, N mm-wave power detectors, where is N is an integer number larger than zero, first detector (214), second detector (215); analog signal combing entity (213), power splitter, mixer, signal conditioning analog circuitry with voltage gain control at lower frequency and analog filtering structures by lower frequency;

an analog to digital conversion entity (30);

a digital processing functionality (40) including controlling functionality (41) and calculation and memory capacity for performing digital signal processing;

an interface to entity outside of first Apparatus (100), including N digital wired interfaces, where N is an integer number;

a supporting circuitry (50), including a mechanical interface to the environment, where the first apparatus (100) is, working and supporting electronic circuitry for power supply of the first apparatus (100);

where the first apparatus (100) is observing area, with direct line-of-sight operation, where the method of operation comprises:

transmission of mm-wave signals generated in mm-wave RF IC front end (10) using planar antenna system for transmitting mm-wave radio signals (22), where the signal contains the continues increase or decrease of the frequency (frequency ramp), being generated by voltage control oscillator (VCO), fractional N phase locked loop (PLL), with continues increase or decrease of the frequency (frequency ramp) being larger than 400 MHz and gain controlled power amplifier (PA) both integrated in mm-wave front end (10);

receiving mm-wave signals reflected from observation area using the first planar antenna system (211);

splitting the signal and providing it to the mixer in mmr-wave front end (10);

down-conversion of the signals by mixing with incoming signal with voltage control oscillator (VCO) generating frequency ramp signal in mm-wave RF IC front end (10);

amplification of the converted signal after mixer iri mm-wave RF IC front end (10);

analog filtering of the signals after amplification in mm-wave RF IC front end (10);

signal conditioning in mm-wave front end (10) for subsequent analog to digital conversion performed by analog to digital conversion functionality (30); and provision to digital signal processing entity (40);

digital processing of the signal in digital signal processing entity (40) by executing:

information from the previous arbitrary processed signal using frequency modulated continuous wave (FMCW) radar calculation principles and providing this information to an interface to external, remote information evaluation, control and action unit (60);

initializing adjusting of gain control of the power amplifier (PA) in mm-wave front end (10) in order to meet the detection range of the first power detector (214) and second power detector (215);

the first apparatus (100) is sending continues wave (CW) signals at a specific frequency of operation, being generated by phase locked loop (PLL) and voltage-controlled oscillator (VCO) in mm-wave front end (10), through the planar antenna system for transmitting mm-wave radio signals;

receiving mm-wave signals reflected from observation area using the first planar antenna system for receiving mm-wave radio signals (211); splitting the signal and providing it to a linear signal combining (213), where the linear signal combining entity (213) enables magnitude change, signal phase changes as well as signals combining, where linear signal combining entity (213) is released by-distributed passive or active analog circuitry means;

receiving mm-wave signals reflected from observation area using the second planar antenna system for receiving mm-wave radio signals (212); and providing it to a linear signal combining entity (213), where the linear signal combining entity (213) enables magnitude change, signal phase changes as well as signals combining, where the linear signal combining entity (213) is released by distributed passive or active analog circuitry means;

providing linearly combined antenna input signals by the linear signal combining entity (213) to the first power detectors (214) and to the second power detector (215);

providing the first power detectors (214) and, the second power detector (215) outputs to the analog to digital conversion entity (30), which provides digitalized signals to the digital processing entity (40);

where the digital processing entity (40) is:

calculating azimuth angle to the obstacle by utilizing mathematical calculation with following inputs: first power detector (214) and the second the power detector (215) values, the physical distance (d) between first planar antenna system for receiving mm-wave radio signals (211), and second planar antenna system for receiving mm-wave radio signals (212) in the first apparatus (100), using algebraic and inverse trigonometric mathematical calculations in the polynomial manner, where the physical distance between antennae in the first apparatus (100) is chosen to take specific value related to the wavelength of the operational frequency;

providing calculated angle information to an interface to external, remote information evaluation, control and action unit (60);

interface to external, remote information evaluation, control and action unit (60) provides the information about object angle and object distance to vehicle infrastructure.

2. A second parking sensor apparatus and method of operation (101), where mm-wave declares operation between 30 GHz and 300 GHz, comprising of:

a planar antenna system for transmitting mm-wave radio signals (22);

a first planar antenna system for receiving m-wave radio signals (211);

a second planar antenna system for receiving mm-wave radio signals (212), being at distance (d) from the first planar antenna system for receiving mm-wave radio signals (211), perpendicular to the sensor observing area;

Integrated mm-wave radio front end (10), having on-chip integrated mm-wave voltage control oscillator (VCO), mm-wave power amplifier (PA), digital control interface, power supply; phased locked loop (PLL) enabling continues wave (CW) operation-locked to specific frequency, N mm-wave power detectors where is N is an integer number larger than zero, a first power detector (214), a second power detector (215); analog signal combing entity (213), where N mm-wave power detectors have filtering and amplification after envelope detection;

an analog to digital conversion entity (30);

a digital processing functionality (40) including controlling functionality (41) and calculation and memory capacity for performing digital signal processing by arbitrary type of the realization options;

an interface to entity outside of the second apparatus (101), including M digital wired interfaces, where M is an integer number larger than zero;

a supporting circuitry (50), including a mechanical interface to the environment, where the second apparatus (101) is working and supporting electronic circuitry for power supply of the second apparatus (101), where apparatus (101) is observing area, with direct line-of-sight operation, where the method of operation includes:

transmission of mm-wave signals generated in the mm-wave front end (10) using the planar antenna system for transmitting mm-wave radio signals (22), where the signal contains the continues wave (CW) signal, being generated by voltage control oscillator (VCO) and gain controlled power amplifier (PA), both integrated-in the mm-wave front end (10);

receiving mm-wave signals reflected from observation area using the first planar antenna system for receiving mm-wave radio signals (211); providing it to a linear signal combining entity (213), where the linear signal combining entity (213) enables magnitude change, signal phase changes as well as signals combining, where the linear signal combining entity (213) is released by analog circuitry means;

receiving mm-wave signals reflected from observation area using the first planar antenna system for receiving mm-wave radio signals (212); providing it to the linear signal combining entity (213), where the entity (213) enables magnitude change, signal phase changes as well as signals combining, where the linear signal combining entity (213) is released by distributed passive or active analog circuitry means;

providing linearly combined antenna input signals by the linear signal combining entity (213) to the first power detector (214), and the second power detector (215);

Providing first power detector (214) output, and second power detector (215) output to analog to digital conversion entity (30), which provides digitalized signals to the digital processing entity (40);

where the digital processing entity (40) is:

calculating azimuth angle to the obstacle by utilizing mathematical calculation with following inputs: first power detector (214) and second power detector (215) values, the first planar antenna system for receiving mm-wave radio signals antenna (211), and the second planar antenna system for receiving mm-wave radio signals (212) physical distance in the second apparatus (101), using algebraic and inverse trigonometric mathematical calculations in the polynomial manner, where the physical distance between antennae in the second apparatus (101) is chosen to take specific value related to the wavelength of the operation frequency, and operation frequency;

providing calculated angle information to an interface to external, remote information evaluation, control and action unit (60);

the interface to external, remote information evaluation, control and action unit (60) is further providing the information about the angle to the obstacle to an external computational unit;

where the external computational unit is gathering calculated different azimuth angles to the obstacle, from N different second apparatuses (101), where N is an integer larger than 1, and knowing the physical distance between N different second apparatuses (101), calculated also the distances from the obstacle, having its position in front of the parking sensor observation plane.

3. Parking sensor apparatus containing a third apparatus (102*a*) and; a fourth apparatus (102*b*) and method of operation, where mm-wave declares operation between 30 GHz and 300 GHz, comprising of:

where the third apparatus (102*a*) has:

a planar antenna system for transmitting mm-wave radio signals (22) in the third apparatus (102*a*);

an integrated mm wave RF IC radio front end (10), having on-chip integrated mm-wave voltage control oscillator (VCO), mm-wave power amplifier (PA), digital control interface, power supply; phase locked loop (PLL) enabling continues wave (CW) operation locked to specific frequency;

an interface to entity outside of the third apparatus (102*a*), including N digital wired interfaces, where N is an integer number larger than zero;

an interface to entity outside of the third apparatus (102*a*), including K digital wireless interfaces, where K is an integer number;

a digital control entity (41);

a supporting circuitry (50), including a mechanical interface to the environment, where the third apparatus (102*a*) operates and supporting electronic circuitry for power supply of the third apparatus (102*a*);

where the fourth apparatus (102*b*) has:

a planar antenna for receiving mm-wave radio signals (211) in the fourth apparatus (102*b*);

a planar antenna system for receiving mm-wave radio signals (212) in the fourth apparatus (102*b*), being at distance (d) from planar antenna system for receiving mm-wave radio signals (211), perpendicular to the sensor observing area;

N mm-wave power detectors where is N is an integer number larger than one, first power detector (214), the second power detector (215); analog signal combining entity (213), where N mm-wave power detectors have filtering and amplification after power detection;

an analog to digital conversion entity (30);

a digital processing functionality (40) including controlling functionality (41) and calculation and memory capacity for performing digital signal processing;

an interface to entity outside of fourth apparatus (102*b*), including M digital wired interfaces, where M is an integer number larger than zero;

an interface to entity outside of fourth Apparatus (102*b*), including K digital wireless interfaces, where K is an integer number;

a supporting circuitry (50), including a mechanical interface to the environment, where the fourth apparatus (102*b*) operates and supporting electronic circuitry for power supply of (102*b*);

where the third apparatus (102*a*) transmits signals and the fourth apparatus (102*b*) receives signals in observing area, with direct line-of-sight operation, where the method of operation includes:

transmission of mm-wave signals generated in mm-wave RF IC Front End (10) using the planar antenna system for transmitting mm-wave radio signals (22) of the third apparatus (102*a*), where the signal contains the continues wave (CW) signal, being generated by voltage control oscillator (VCO) and gain controlled poweramplifier (PA), both integrated in mm-wave front end (10);

in the fourth apparatus (102*b*):

receiving mm-wave signals reflected from observation area using the first planar antenna system for receiving mm-wave radio signals (211); providing it to the linear signal combining entity (213), where the linear signal combining entity (213) enables magnitude change, signal phase changes as well as signals combining, where linear signal combining entity (213) is released by distributed analog circuitry means;

receiving mm-wave signals reflected from observation area using the second planar antenna system for receiving mm-wave radio signals (212) of the fourth apparatus (102*b*); and providing it to the linear signal combining entity (213), where the linear signal combining entity (213) enables magnitude change, signal phase changes as well as signals combining, where the linear signal combining entity (213) is realized by distributed analog circuit means;

providing linearly combined antenna input signals by the linear signal combining entity (213) to the first power detector (214) and the second power detector (215);

providing first power detectors (214) output and second power detector (215) output to analog to digital conversion entity (30), which provides digitalized signals to signal processing entity (40);

the digital processing entity (40) is:

calculating azimuth angle to the obstacle by utilizing mathematical calculation with following inputs: first power detector (214) value and second power detector (215) value, the first planar antenna system for receiving mm-wave radio signals (211), the second planar antenna system for receiving mm-wave radio signals (212) physical distance in the fourth apparatus (102*b*), using algebraic and inverse trigonometric mathematical calculations in the polynomial manner, where the physical distance between first planar antenna system for receiving mm-wave radio signals (211), and second planar antenna system for receiving mm-wave radio signals (212) in the fourth apparatus (102*b*) is chosen to take a specific value related to the wavelength of the operation frequency and operation frequency;

providing calculated angle information to the interface to external, remote information evaluation, control and action unit (60);

the interface to external, remote information evaluation, control and action unit (60) is providing the information about angle to the obstacle to an external computation unit;

an external computation unit is gathering calculated different azimuth angles to obstacle, from N different fourth apparatuses (102*b*), where N is an integer larger than 2 and knowing the physical distance between N different fourth apparatuses (102*b*), the external computation unit is calculating the distances from the obstacle, having its position in front of the parking sensor observation plane, where the complete parking support system may contain J third apparatuses (102*a*), where J is an integer larger than zero.

4. System according to claim 1 in which linear signal combining entity (213) contains two splitters, two power combiners and one phase shifter of 90 degrees realized in mm-wave front end (10), providing mm-wave two combined signals to input of mm-wave first power detector (214) and to input of mm-wave second power detector (215).

5. System according to claim 1 in which the distance (d) between first planar antenna system for receiving mm-wave radio signals (211) and second planar antenna system for receiving mm-wave radio signals (212) is between one quarter the wavelength and one whole the wavelength related to the frequency of operation.

6. System according to claim 1, in which the first apparatus (100) and Method of Operation are incorporating the extraction and analysis of the object being a living being with own vibration rate dedicated to living being vital signs vibration information, by transmitting continues wave (CW) signal over planar antenna system for transmitting mm-wave radio signals (21) with the operation in the Doppler radar mode, receiving the signal by first planar antenna system for receiving mm-wave radio signals (211), mixing in mixer incoming and reflected signal an providing after signal conditioning the analog information to the analog digital conversion entity (30). The digital signal is then processed by digital signal processing entity (40) with digital filtering in an adjustment of power level and radar Doppler mode start signal processing entity (46), vibrations detections and decision making process of existence of a living being in an vibration rate calculation signal processing entity (47), and in an vibration signals rate analysis signal processing entity (48), and in an detection of a life being signal processing entity (49).

7. System according to claim 1, in which the first apparatus (100) and Method of Operation incorporate:

Digital processing of the signals in the digital processing entity (40) which additionally includes classification of vibrations frequencies from the previous arbitrary processed signal, detecting the type of life being.

8. System according to claim 1, in which the first, second, third and fourth apparatuses (100, 101, 102*a* and 102*b*) incorporate:

Digital processing of the signal in digital processing entity (40) and existence of the wireless interface (63), within the interface to external, remote information evaluation, control and action unit (60), which enables remote wireless communication to the world outside the Apparatus (100, 101, 102*a* and 102*b*), by one of the wireless communication standards.

9. System according to claim 1, in which more than one of first apparatuses 100, are arranged to commonly controlled system to provide observation of larger observation area, compared to observation area of only one first apparatus (100) to enhance the accuracy of the distance detection, by combining information about own calculated distance and distances being obtained by angle detection information of M additional different first apparatuses (100), where M may take integer numbers larger than one.

10. System according to claim 1, in which more than one of first apparatuses 100, are arranged to commonly controlled system to provide observation of larger observation area, compared to observation area of only one first apparatus (100) to calculate the angles, position and distance, by combining information about own calculated distance and distances being obtained by distance detection information of M additional different first apparatuses (100), where M may take integer numbers larger than one.

11. System according to claim 1, in which more than one of first apparatuses 100, are arranged to commonly controlled system to provide observation of larger observation area, compared to observation area of only one first apparatus (100) to calculate the angles, and position and distance of the obstacle to the surface with apparatuses, combining information of the detected particular angles of each first apparatuses (100) to the obstacle, performing the mathematical calculation, including the distance between M additional different first apparatuses (100), where M may take integer numbers larger than one.

12. System according to claim 2, in which more than one the second apparatuses (101), are arranged to commonly controlled system to provide observation of larger observation area, compared to observation area of only one second apparatus (101) and position and distance of the obstacle to the surface with apparatuses, by combining information of the detected particular angles of each second apparatuses (101) to the obstacle, performing the mathematical calculation, including the distance between M additional different second apparatuses (101), where M may take integer numbers larger than one.

13. System according to claim 3, in which more than one fourth apparatuses (102*b*), are arranged to commonly controlled system to provide observation of large observation area, combining information of detected angles of M additional different fourth apparatuses (102*b*), where M may take integer numbers larger than one, where the information of the physical distance of each two fourth apparatuses (102*b*) and information about angles to the obstacles being detected by each two fourth apparatuses (102*b*) are used for obstacle distance calculation, by mathematical calculation, where N different third apparatuses (102*a*), where N is integer larger than zero, are sending continuous wave (CW) signal.

14. System according to claim 1, in which classes of first second, third and fourth apparatuses (100, 101, 102*a* and 102*b*), have integrated mm-wave RF front end entity (10) operating in the 77-81 GHz band.

15. System according to claim 1, in which classes of first second, third and fourth apparatuses (100, 101, 102*a* and 102*b*), have integrated mm-wave front end entity (10) being realized by the CMOS technology, with gate lengths less than 90 nm.

16. System according to, claim 1, where entities: analog digital conversion entity (30), digital signal processing entity (40), controlling functionality entity (41) and an interface to external, remote information evaluation, control and action unit (60) are integrated on the same silicon like mm-wave front end entity (10).

17. System according to claim 1, where antenna system entities: the planar antenna system for transmitting mm-wave radio signals (22), the first planar antenna system for receiving mm-wave radio signals (211) and the second planar antenna system for receiving mm-wave radio signals (212) are integrated on the same silicon like mm-wave front end entity (10).

18. System according to claim 1, where the planar antenna system for transmitting mm-wave radio signals (22), the first planar antenna system for receiving mm-wave radio signals (211) and the second planar antenna system for receiving mm-wave radio signals (212) are connected to mm-wave front end entity (10), and entity comprising analog digital conversion functionalities (30), digital signal processing (40) and an interface to external, remote information evaluation, control and action unit (60), using polymer technologies.

19. System according to claim 1, where the planar antenna system for transmitting mm-wave radio signals (22), the first planar antenna system for receiving mm-wave radio signals (211) and the second planar antenna system for receiving mm-wave radio signals (212) are connected to mm-wave front end entity (10), and entity comprising analog digital conversion functionalities (30), digital signal processing (40) and an interface to external, remote information evaluation, control and action unit (60), using LTCC technologies.

20. System according to claim 1, the planar antenna system for transmitting mm-wave radio signals (22), the first planar antenna, system for receiving mm-wave radio signals (211) and the second planar antenna system for receiving mm-wave radio signals (212) are connected to mm-wave front end entity (10) using differential feeding and where the entities are dipole antennae.

21. System according to claim 1, where antenna system entities: the planar antenna system for transmitting mm-wave radio signals (22), the first planar antenna system for receiving mm-wave radio signals (211) and the second planar antenna system for receiving mm-wave radio signals (212) are realized by the planar printed dipoles, where first, second, third and fourth class of apparatuses (100, 101, 102*a* and 102*b*) have reflector to provide the radiation diagram perpendicular to the surface of the apparatuses.

* * * * *